(12) United States Patent
Cervelli et al.

(10) Patent No.: US 10,867,178 B2
(45) Date of Patent: *Dec. 15, 2020

(54) SYSTEMS AND METHODS FOR COHERENT MONITORING

(71) Applicant: Palantir Technologies Inc., Palo Alto, CA (US)

(72) Inventors: Daniel Cervelli, Mountain View, CA (US); Anand Gupta, New York, NY (US); Andrew Elder, New York, NY (US); Robert Imig, Austin, TX (US); Praveen Kumar Ramalingam, Washington, DC (US); Reese Glidden, Washington, DC (US); Matthew Fedderly, Baltimore, MD (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,256

(22) Filed: Sep. 9, 2019

(65) Prior Publication Data

US 2020/0250394 A1 Aug. 6, 2020

Related U.S. Application Data

(63) Continuation of application No. 16/359,360, filed on Mar. 20, 2019, now Pat. No. 10,452,913.
(Continued)

(51) Int. Cl.
*G06T 7/20* (2017.01)
*G06K 9/00* (2006.01)
(Continued)

(52) U.S. Cl.
CPC ....... *G06K 9/0063* (2013.01); *G06F 3/04842* (2013.01); *G06K 9/00201* (2013.01); *G06K 9/6267* (2013.01); *G06T 7/20* (2013.01)

(58) Field of Classification Search
CPC ............. G06K 9/0063; G06K 9/00201; G06K 9/6267; G06T 7/20; G06F 3/04842
(Continued)

(56) References Cited

U.S. PATENT DOCUMENTS

| 6,912,695 B2 | 6/2005 | Ernst et al. |
| 7,119,811 B2 | 10/2006 | Ernst et al. |

(Continued)

FOREIGN PATENT DOCUMENTS

EP 3410338 12/2018

OTHER PUBLICATIONS

Extended European Search Report for EP Appln. No. 20154956.2 dated Mar. 18, 2020, 11 pages.
(Continued)

*Primary Examiner* — Sheela C Chawan
(74) *Attorney, Agent, or Firm* — Sheppard Mullin Richter & Hampton LLP

(57) ABSTRACT

Systems and methods are provided for intelligently monitoring environments, classifying objects within such environments, detecting events within such environments, receiving and propagating input concerning image information from multiple users in a collaborative environment, identifying and responding to situational abnormalities or situations of interest based on such detections and/or user inputs.

20 Claims, 13 Drawing Sheets

Related U.S. Application Data

(60) Provisional application No. 62/799,292, filed on Jan. 31, 2019.

(51) Int. Cl.
  *G06K 9/62* (2006.01)
  *G06F 3/0484* (2013.01)

(58) Field of Classification Search
  USPC ....... 382/100, 103, 106, 107, 109, 113, 115,
    382/171, 172, 173, 181, 189, 190, 191,
    382/209; 348/169; 365/185.22, 201,
    365/185.09, 200, 230.03, 185.18, 185.29;
    714/718, 704, 726, 738, 736, 799, 733,
    714/723
  See application file for complete search history.

(56) References Cited

U.S. PATENT DOCUMENTS

| | | | |
|---|---|---|---|
| 7,607,106 B2 | 10/2009 | Ernst et al. | |
| 7,664,292 B2 | 2/2010 | Van den Bergen | |
| 7,840,908 B2 | 11/2010 | Ernst et al. | |
| 8,107,680 B2 | 1/2012 | Henson | |
| 8,290,346 B2 | 10/2012 | Ernst et al. | |
| 8,341,548 B2 | 12/2012 | Ernst et al. | |
| 8,411,970 B2 | 4/2013 | Thakkur | |
| 8,503,760 B2 | 8/2013 | Lee | |
| 8,532,383 B1 | 9/2013 | Thakkur et al. | |
| 8,532,397 B1 | 9/2013 | Thakkur et al. | |
| 8,644,690 B2 | 2/2014 | Ernst et al. | |
| 8,755,609 B2 | 6/2014 | Thakkur et al. | |
| 8,768,106 B2 | 7/2014 | Thakkur et al. | |
| 8,819,163 B2 | 8/2014 | Carlson | |
| 8,885,940 B2 | 11/2014 | Thakkur et al. | |
| 8,949,913 B1 | 2/2015 | Thakkur et al. | |
| 8,984,438 B2 | 3/2015 | Ernst | |
| 9,002,057 B2 | 4/2015 | Outtagarts | |
| 9,058,642 B2 | 6/2015 | Thakkur et al. | |
| 9,123,092 B2 | 9/2015 | Thakkur et al. | |
| 9,129,348 B2 | 9/2015 | Thakkur et al. | |
| 9,129,349 B2 | 9/2015 | Thakkur et al. | |
| 9,175,975 B2* | 11/2015 | Shtukater | G01S 19/13 |
| 9,177,525 B2 | 11/2015 | Ernst et al. | |
| 9,178,931 B2 | 11/2015 | Pakula et al. | |
| 9,218,637 B2 | 12/2015 | Thakkur et al. | |
| 9,239,855 B2 | 1/2016 | Thakkur et al. | |
| 9,275,302 B1 | 3/2016 | Yan | |
| 9,288,448 B2 | 3/2016 | Park | |
| 9,396,514 B2 | 7/2016 | Thakkur et al. | |
| 9,407,876 B1 | 8/2016 | Ernst et al. | |
| 9,436,708 B2 | 9/2016 | Thakkur et al. | |
| 9,477,996 B2 | 10/2016 | Thakkur et al. | |
| 9,489,729 B2 | 11/2016 | Thakkur | |
| 9,501,806 B2 | 11/2016 | Thakkur et al. | |
| 9,576,769 B2 | 2/2017 | Kanai | |
| 9,584,584 B2 | 2/2017 | Thakkur et al. | |
| 9,596,288 B2 | 3/2017 | Thakkur et al. | |
| 9,621,904 B2 | 4/2017 | Ernst et al. | |
| 9,684,848 B2 | 6/2017 | Thakkur | |
| 9,703,807 B2 | 7/2017 | Thakkur et al. | |
| 9,747,350 B2 | 8/2017 | Carlson | |
| 9,881,029 B2 | 1/2018 | Thakkur et al. | |
| 9,947,072 B2 | 4/2018 | Thakkur et al. | |
| 9,998,524 B2 | 6/2018 | Thakkur et al. | |
| 10,049,123 B2 | 8/2018 | Thakkur | |
| 10,169,375 B2 | 1/2019 | Thakkur et al. | |
| 10,186,042 B2 | 1/2019 | Liu | |
| 10,452,913 B1* | 10/2019 | Cervelli | G06K 9/00201 |
| 10,592,934 B2* | 3/2020 | Michel | G06K 9/3258 |
| 2004/0119848 A1 | 6/2004 | Buehler | |
| 2013/0297998 A1* | 11/2013 | Devara | G06F 16/958 |
| | | | 715/205 |
| 2018/0012082 A1 | 1/2018 | Satazoda et al. | |

OTHER PUBLICATIONS

Kojima et al., "Intelligent Technology for More Advanced Autonomous Driving", Hitachi, vol. 67, Review Nr 1, 2018, pp. 58-63, Retrieved from the Internet: https://www.hitachi.com/rev/archive/2018/r2018_01/10a03/index.html, retrieved on Mar. 3, 2020.

* cited by examiner

SYSTEMS AND METHODS FOR COHERENT MONITORING

CROSS REFERENCE TO RELATED APPLICATIONS

This application is a continuation application of U.S. application Ser. No. 16/359,360, filed Mar. 20, 2019, now U.S. Pat. No. 10,452,913 which claims the benefit under 35 U.S.C. § 119(e) of U.S. Provisional Applications No. 62/799,292, filed Jan. 31, 2019, the content of each of which is incorporated by reference in their entirety into the present disclosure.

TECHNICAL FIELD

The present disclosure relates to systems and methods for coherent and intelligent environment monitoring, and some particular embodiments relate to novel systems and methods for orchestrating inputs from multiple sources to construct a coordinated and coherent observation consumption environment.

BACKGROUND

Conventional systems and methods for monitoring or surveilling regions of interest do not include effective orchestration and coordination tools, nor do they provide the granular insights that would otherwise inform effective and timely decision-making in critical scenarios. Despite extensive research and development efforts, current systems and methods for monitoring environments do not enable effective content navigation, feature detection, object detection, event detection, situational awareness recognition, classification, insights, nor and use of inputs from multiple sources.

Moreover, today's monitoring systems are not useful across a range of applications where technical monitoring solutions would otherwise be valuable (e.g., agriculture and land use applications, aviation, environment, marine, public safety and disaster relief, rail, recreation, roads and highways, space, surveying, search and rescue applications, farming and ranching operations, energy deployments, sports, traffic monitoring, trespass and security applications, etc.). Accordingly, flexible solutions for meeting such demands are needed.

SUMMARY

In accordance with one embodiment, a system for intelligently monitoring an environment is provided, comprising: one or more processors and a memory storing instructions which, when executed by the one or more processors, cause the system to: obtain image information representing an environment; provide the image information for display on a display associated with at least one device; identify, based on the image information, one or more discrete objects observed within the environment; and classify, based on the image information in comparison with an object template, the one or more discrete objects. In some embodiments the systems of the present disclosure may be configured to further generate a graphic representing the one or more discrete objects observed within the environment, and/or display the graphic as an overlay on top of the displayed image information.

In some embodiments, the graphic may be provided over a location (or a portion of the location) on the displayed image information corresponding to the location of the discrete object within the environment at the time the image information was captured. The graphic may represent a classification of the one or more discrete objects observed within the environment, and/or comprise a visual attribute providing an indication of a confidence score associated with the identified discrete object. In some embodiments, the systems of the present disclosure may further track one or more of location information, path information, and heat signature information associated with the one or more discrete objects over a period of time; and/or determine, based on the tracking, that an event condition associated with the discrete object has been satisfied. Similarly, the systems of the present disclosure may determine that a notification condition associated with a discrete object has been satisfied, and/or modify the graphic based on one or more of the classification, the event condition, and the notification condition determination. The systems of the present disclosure may provide, responsive to a user selection of the graphic, a modified view of a portion of the image information corresponding to a cropped zone within the environment surrounding the identified discrete object.

The systems of the present disclosure may further be configured to estimate a real-world dimensions of a portion of at least one of the identified discrete objects. In some embodiments, systems of the present disclosure may provide, responsive to a user selection of at least two points corresponding to locations within the image information provided for display on a device, an estimated real-world distance between the at least two points.

In some embodiments, systems of the present disclosure may provide the image information for display on at least two devices operated by two different users; and/or may receive, from one of the at least two devices (e.g., under the control of one of the at least two users), a tagging command corresponding to at least one of the discrete objects identified in the image information; and/or provide, at the others of the at least to devices, an indication of the tagging command.

In some embodiments, the systems of the present disclosure may compute a number of discrete objects of a single classification identified within a portion of the image information; and/or compute a confidence score for the classification of the at least one identified discrete object.

In accordance with one embodiment, a method for intelligently monitoring an environment is provided comprising the steps of: obtaining image information representing an environment; providing the image information for display on a display associated with at least one device; identifying, based on the image information, one or more discrete objects observed within the environment; and classifying, based on the image information in comparison with an object template, the one or more discrete objects. In some embodiments the methods of the present disclosure involve further generating a graphic representing the one or more discrete objects observed within the environment, and/or displaying the graphic as an overlay on top of the displayed image information.

In some embodiments, the methods of the present disclosure may involve the step of providing a graphic as an overlay over a location (or a portion of the location) on the displayed image information corresponding to the location of the discrete object within the environment at the time the image information was captured. The graphic may represent a classification of the one or more discrete objects observed within the environment, and/or comprise a visual attribute providing an indication of a confidence score associated with the identified discrete object. In some embodiments, the methods of the present disclosure involve tracking one or more of location information, path information, and heat signature information associated with the one or more discrete objects over a period of time; and/or determining, based on the tracking, that an event condition associated with the discrete object has been satisfied. Similarly, the methods of the present disclosure may involve determining that a notification condition associated with a discrete object has been satisfied, and/or modifying the graphic based on one or more of the classification, the event condition, and the notification condition determination. The methods of the present disclosure may, in some embodiments, involve providing, responsive to a user selection of the graphic, a modified view of a portion of the image information corresponding to a cropped zone within the environment surrounding the identified discrete object.

The methods of the present disclosure may involve estimating a real-world dimensions of a portion of at least one of the identified discrete objects. In some embodiments, methods of the present disclosure may involve providing, responsive to a user selection of at least two points corresponding to locations within the image information provided for display on a device, an estimated real-world distance between the at least two points.

In some embodiments, the methods of the present disclosure may involve providing the image information for display on at least two devices operated by at least two different users; and/or may involve receiving, from one of the at least two devices (e.g., under the control of one of the at least two users), a tagging command corresponding to at least one of the discrete objects identified in the image information; and/or providing, at the others of the at least to devices, an indication of the tagging command.

In some embodiments, the methods of the present disclosure may involve computing a number of discrete objects of a single classification identified within a portion of the image information; and/or computing a confidence score for the classification of the at least one identified discrete object.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

A claimed solution rooted in computer technology overcomes problems specifically arising in the realm of computer technology. In various implementations, a computing system is configured to provide an insight-driven monitoring environment in which the intelligent transformation of aggregated observational detections may inform situational decision-making in a streamlined, collaborative, and coherent manner.

Intelligent Monitoring System

In some embodiments, the present disclosure relates to an intelligent monitoring system in which data from various sources may be aggregated to generate intelligent insights about an environment being surveilled. The intelligent monitoring system may be configured to provide multiple users with a collaborative and interactive interface for observing streamlined indications of intelligent insights, and engaging in on-the-fly review, navigation, tagging, flagging, evaluation, and other consumption of such surveillance information.

Figure 1A:
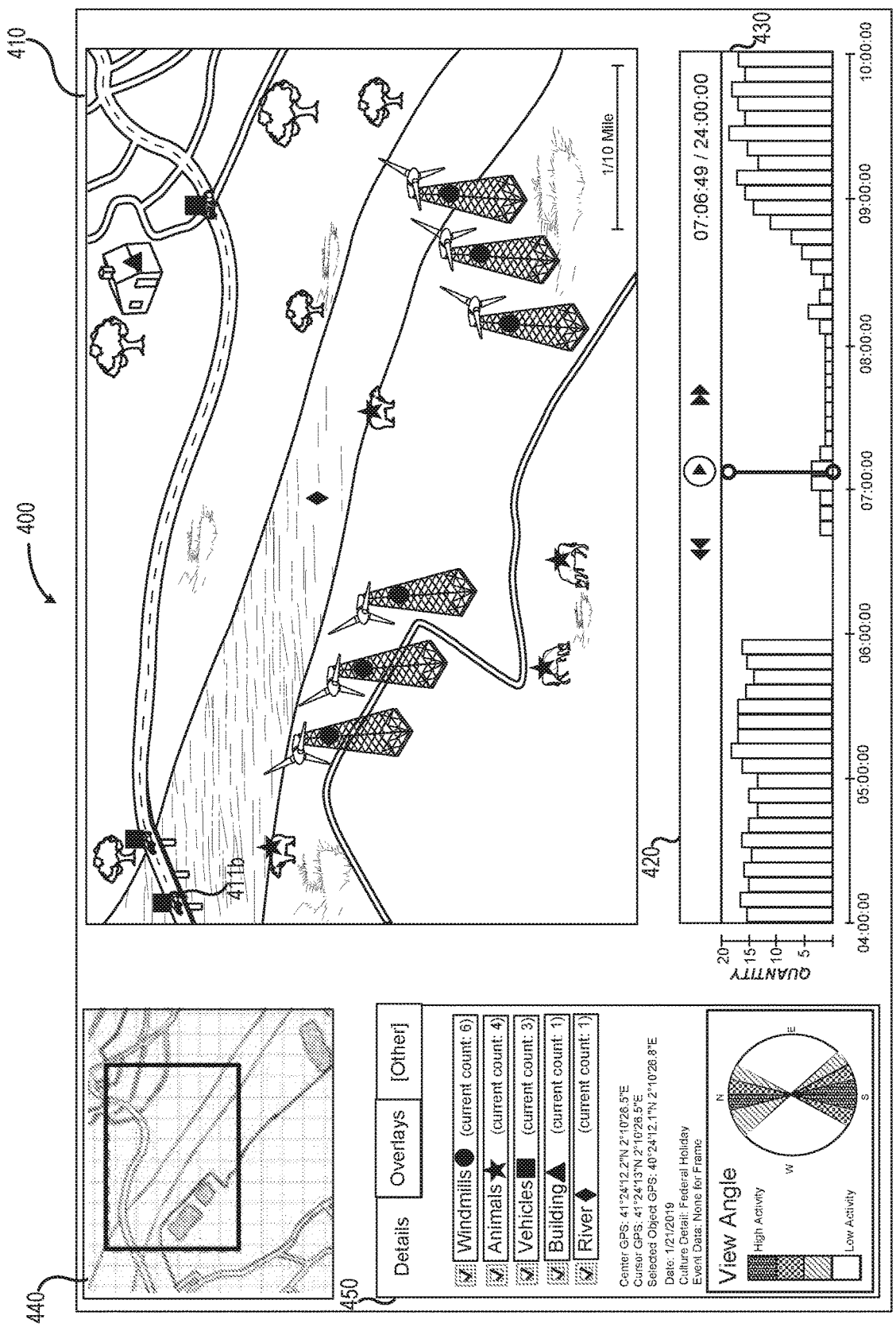
FIG. 1A illustrates an example intelligent interactive interface through which the advanced consumption, insight and interactivity technologies of the present disclosure may be provided.
Figure 1B:
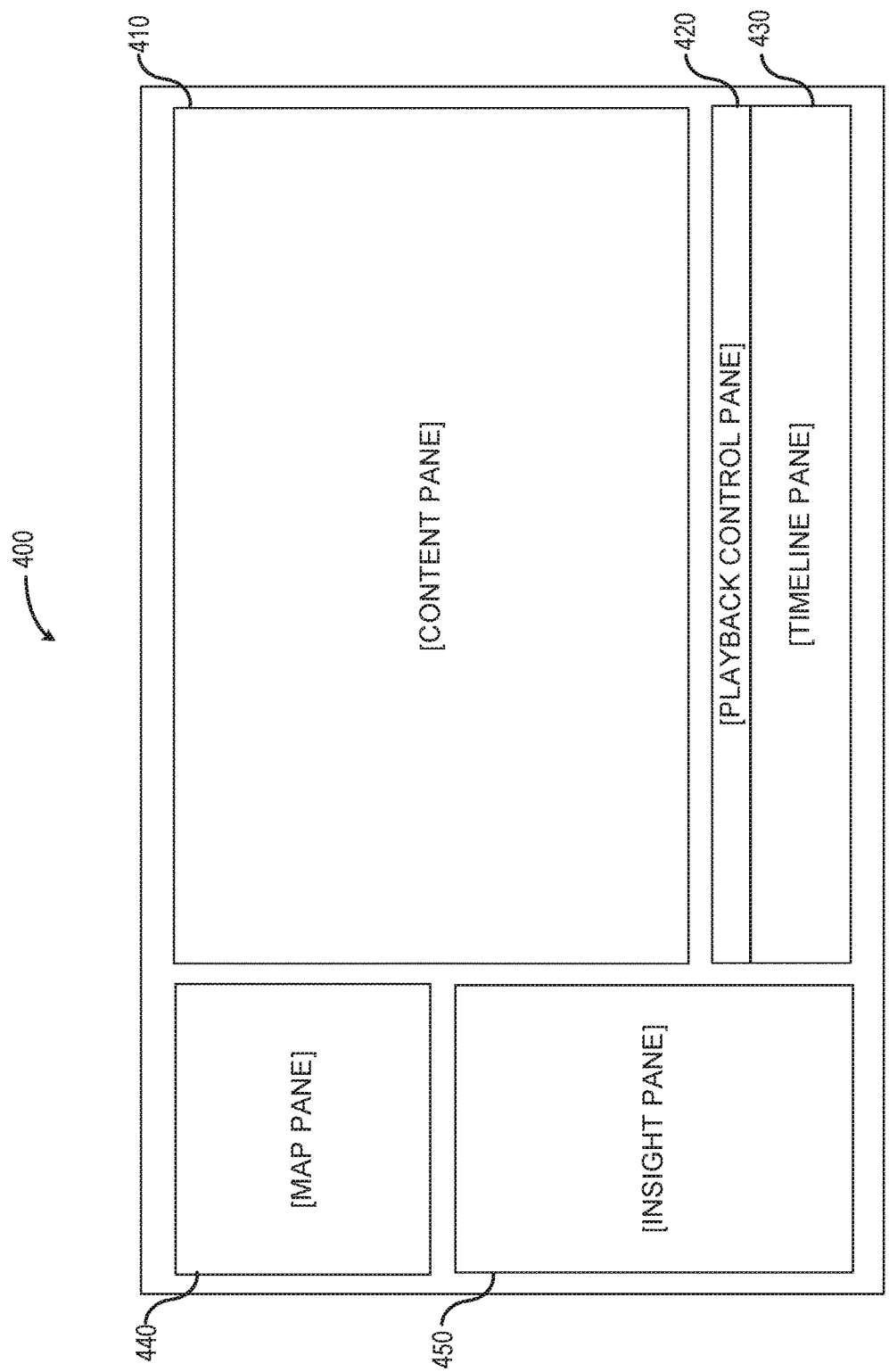
FIG. 1B illustrates an example intelligent interactive interface through which the advanced consumption, insight and interactivity technologies of the present disclosure may be provided.

Before discussing the inter-workings of intelligent monitoring systems of the present disclosure, an example interface conveying example information made available through such systems is provided for context. In particular, FIGS. 1A and 1B illustrate example interfaces that provide context and nomenclature for various features disclosed herein. Such example user interfaces that may be provided via the systems of the present disclosure, and depict an example of how the advanced consumption, insight and interactivity technologies of the instant disclosure may be presented in various applications.

FIG. 1A illustrates an example of an intelligent interactive interface 400 that may be implemented in connection with systems of the present disclosure. Although various aspects will be discussed in more detail with respect to FIGS. 2A-2D, FIG. 1A depicts a symbolic example of intelligent insight information that may be provided in accordance with various embodiments of the present disclosure. As shown, an intelligent interactive interface 400 may include a content pane 410 for displaying raw or augmented video content collected by one or more sensors observing the recorded environment. The systems of the present disclosure may derive geographic information corresponding to the recorded environment, and simultaneously (in real-time or near real-time) populate a map pane 440 with map content that corresponds to the region of real world space being viewed in the content pane 410. As shown in map pane 440, the systems of the present disclosure may provide map information that corresponds to a larger landscape than presented in content pane 410 to give a user greater context for what they are viewing in the content pane. As further shown, map pane 440 may provide an outline of the geographic region within the larger mapping that corresponds to the region shown in content pane 410 in a given instance.

The systems of the present disclosure may provide automated detections of objects, events, or other observations based on video content, other content available to the system, or a combination of both. For instance, as shown in FIG. 1A, insights pane 450 may provide one or more indications of insights generated by the system. In the example shown, the systems of the present disclosure may present an indication of a number of objects (here, windmills, animals, vehicles, buildings, and rivers) observed within the scene being played back via content pane 410. Graphical display elements associated with each such object may be generated and dynamically provided for display as an overlay on top of corresponding objects as the video content is played back.

For instance, in the example shown, circle shaped graphical display elements may be provided to overlay detected windmills in the scene, star shaped graphical display elements may be provided to overlay detected animals in the scene, square shaped graphical display elements may be provided to overlay detected vehicles in the scene, triangle shaped graphical display elements may be provided to overlay detected buildings in the scene, and diamond shaped graphical display elements may be provided to overlay detected rivers in the scene. Though the foregoing is provided as an example, it will be appreciated upon review of the remaining disclosure that such graphical display elements may leverage any visual attributes (not merely shape, as in this example) to convey information about detections made by the intelligent systems of the present disclosure.

Also as shown in FIG. 1A, the systems of the present disclosure may provide on-the-fly GPS information as well as dimensional information about the scene. By way of example, insight pane 410 may present GPS coordinates for the center of the image being displayed through content pane 410, or GPS coordinates corresponding to the location in the scene over which the user's cursor is hovering, or GPS coordinates corresponding to one or more selected objects or location in the scene being displayed through content pane 410. Further, the systems of the present disclosure may provide on-the-fly timing details, cultural details, recording details (e.g., viewing angle), and/or event data (discussed in further detail herein).

Also as shown in FIG. 1A, the systems of the present disclosure may provide a graphic representation of one or more insights detected or generated by the system. For instance, a histogram chart displaying a count of total detections within a scene, or a count of a particular type of object found within the scene throughout the video segment may be shown in timeline pane 430. The histogram chart may dynamically change to reflect selections by the user. For example, if the user had selected only the "Animals" object type, the histogram may reflect a count of Animal detections within the video content during predetermined increments of time (e.g., 5 second increments, etc.).

To enable a collaborative consumption experience, the systems of the present disclosure may be configured to provide an intelligent interactive interface to multiple users, and allow selections and other input from one user to be viewed or viewable on-the-fly by another user. This way, multiple users can review a surveillance feed focused on different objects or events of interest, and each may propagate their input to the system such that the input from all users may be viewable by other users. The system may also implement permissions to limit which input information from which users is available to which other users. Many other features of the disclosed technology may be made available through an intelligent interactive interface such as the example interface shown, or in other exemplary interfaces, as will become apparent upon review of the present disclosure.

FIG. 1B illustrates an example interactive user interface layout that may include, inter alia, a content pane 410, a playback control pane 420, a timeline pane 430, a map pane 440, and/or an insight pane 450. FIGS. 1C-1F herein may be discussed with reference to the interactive user interface 400 of FIG. 1B, for ease of description, but it should be appreciated that the scope of the present disclosure is not limited to the depicted embodiments or interfaces, and that different arrangements and variations of the same fall squarely within the scope present disclosure.

Figure 1C:
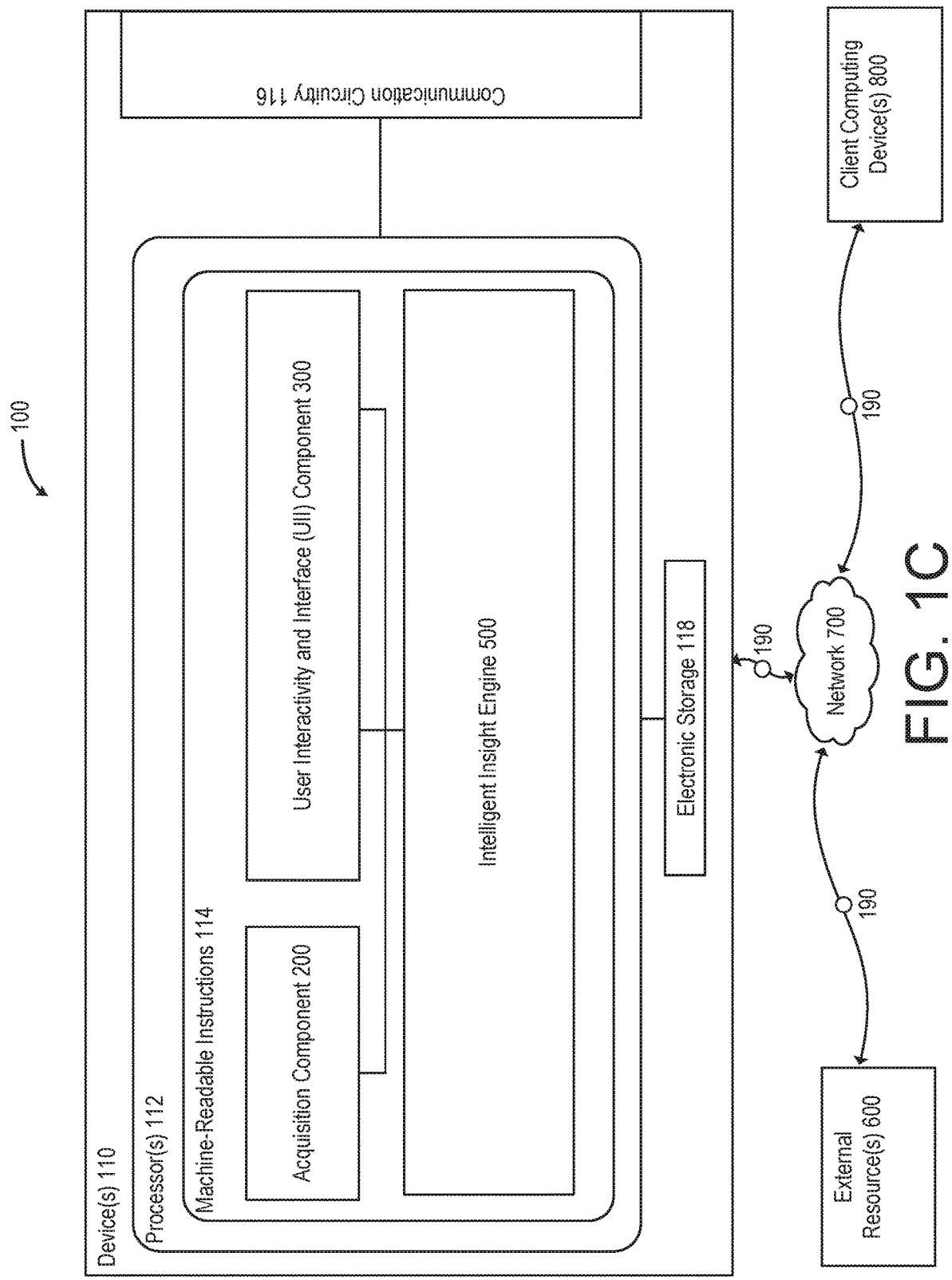
FIG. 1C illustrates a schematic representation of an example architecture of an intelligent monitoring system in accordance with various embodiments.
Figure 1D:
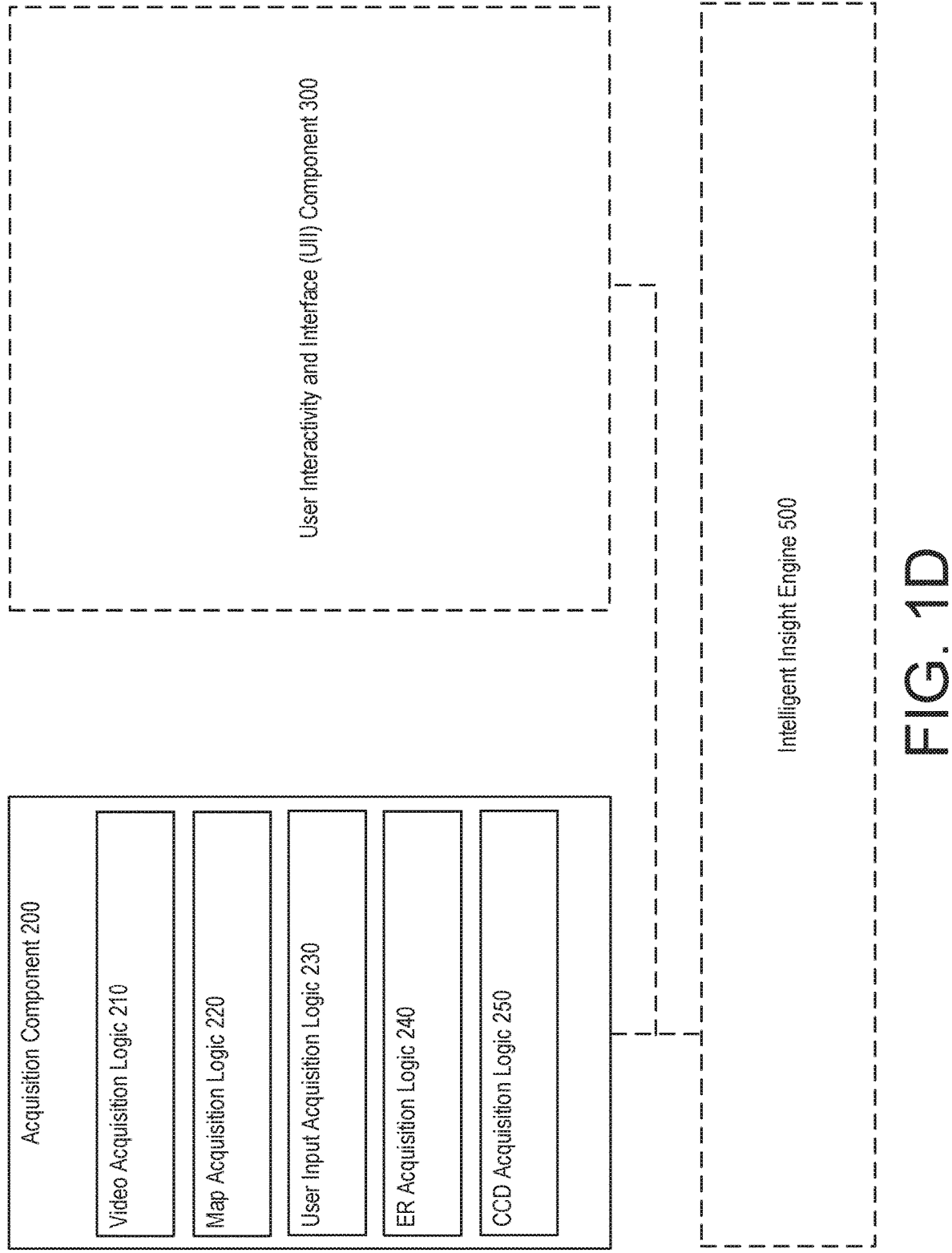
FIG. 1D illustrates a schematic representation of an example architecture of various sub-elements of the intelligent monitoring system of FIG. 1C, in accordance with various embodiments.

FIG. 1C illustrates an example architecture for an intelligent monitoring system 100 in accordance with various embodiments of the present disclosure. As shown, system 100 may include one or more user devices 110 operatively coupled to one or more external resource(s) 600 and/or one or more client computing devices 800 by one or more network communication links 190 through network 700. Device 110 may include any one or more computing devices, including, in some embodiments, one or more servers that host the intelligent monitoring technologies of the present disclosure, and make the same accessible to users of client computing devices 800, which may be disparately located. As shown, devices 110 may embody machine readable-instructions 114 which, when executed by one or more processors 112, effectuate one or more features of the technology disclosed herein.

In some embodiments, device 110 may make some or all of the technology disclosed herein accessible to multiple users via one or more client computing devices 800 via network 700 (e.g., by communicating and exchanging data with one another over one or more network communication links 190). The client computing devices 800 may any type of client computer such as a workstation computer, a laptop computer, a tablet computer, a mobile phone, or other client computing device that has or is operatively coupled to a display, e.g., a video/multimedia display.

As shown in FIG. 1C, machine-readable instructions 114 may include, among other components, an acquisition component 200, a user interactivity and interface (UII) component 300, and an intelligent insight engine 500. Each of these may be in communication with one another, as well as with external resources 600 and client computing devices 800, and be configured to coherently operate in concert with one another to effectuate the technology of the present disclosure. Each is discussed in turn below.

Data Acquisition

Data acquisition is facilitated by acquisition component 200. Acquisition component 200 may be configured to obtain information and data from any one or more sources. Acquisition component 200 may be configured to operate on or otherwise pre-process such data, as necessary, such that the data is transformed into the requisite format required or desired for further operations thereupon by other elements of system 100 (including operations on such data by one or more of UII component 300, and intelligent insight engine 500).

The information and data obtained by acquisition component 200 may include video data, audio data, image data, heat signature date, location data, temperature data, cultural data, user inputted data, pattern recognition data, object identification data, map data, or any other type of data, including any metadata that may be embedded therein, that may be relevant to a user of intelligent monitoring system 100. For example, referring to FIG. 1D, acquisition component 200 may include video acquisition logic 210, map acquisition logic 220, user input acquisition logic 230, external resource (ER) acquisition logic 240, and/or client computing device (CCD) acquisition logic 250.

Video acquisition logic 210 is configured to obtain or receive image, video, and/or audio data, and to make it accessible for use by UII component 300 for display and/or for use by intelligent insight engine 500 for analysis and further processing. Such image data, video data, and or audio data may include various metadata including, for example, GPS data, altitude data, capture parameter data, or any other data associated with the location being recorded within the video, image, or audio data and/or the location from which the video, image, or audio data was captured.

Map acquisition logic 220 is configured to obtain or receive map data, and to further make it accessible for use by UII component 300 for display and/or for use by intelligent insight engine 500 for analysis and further processing. Map data may include, for example, multi-dimensional mapping information, including map data provided by an external resource 600 (FIG. 1C) such as Google Maps, MapQuest, or other provider of road, ocean, space, or other terrain mapping. Additionally or alternatively, map data may be generated by another element of system 100 (not shown).

User input acquisition logic 230 is configured to obtain or receive data entered by a user via a user interface of system 100. External resource (ER) acquisition logic 240 is configured to obtain or receive data from any one or more external resources relevant to a particular deployment, and may further make such data accessible for use by UII component 300 for display and/or for use by intelligent insight engine 500 for analysis and further processing. Client computing device (CCD) acquisition logic 250 may is configured to obtain or receive inputs or other data from one or more connected client computing devices 800 (e.g., prompted by user inputs via multiple client computing devices in a collaborative environment). As shown in FIG. 1C, acquisition component 200 is connected with UII component 300 and intelligent insight engine 500.

Interfacing and Interactivity

Figure 1E:
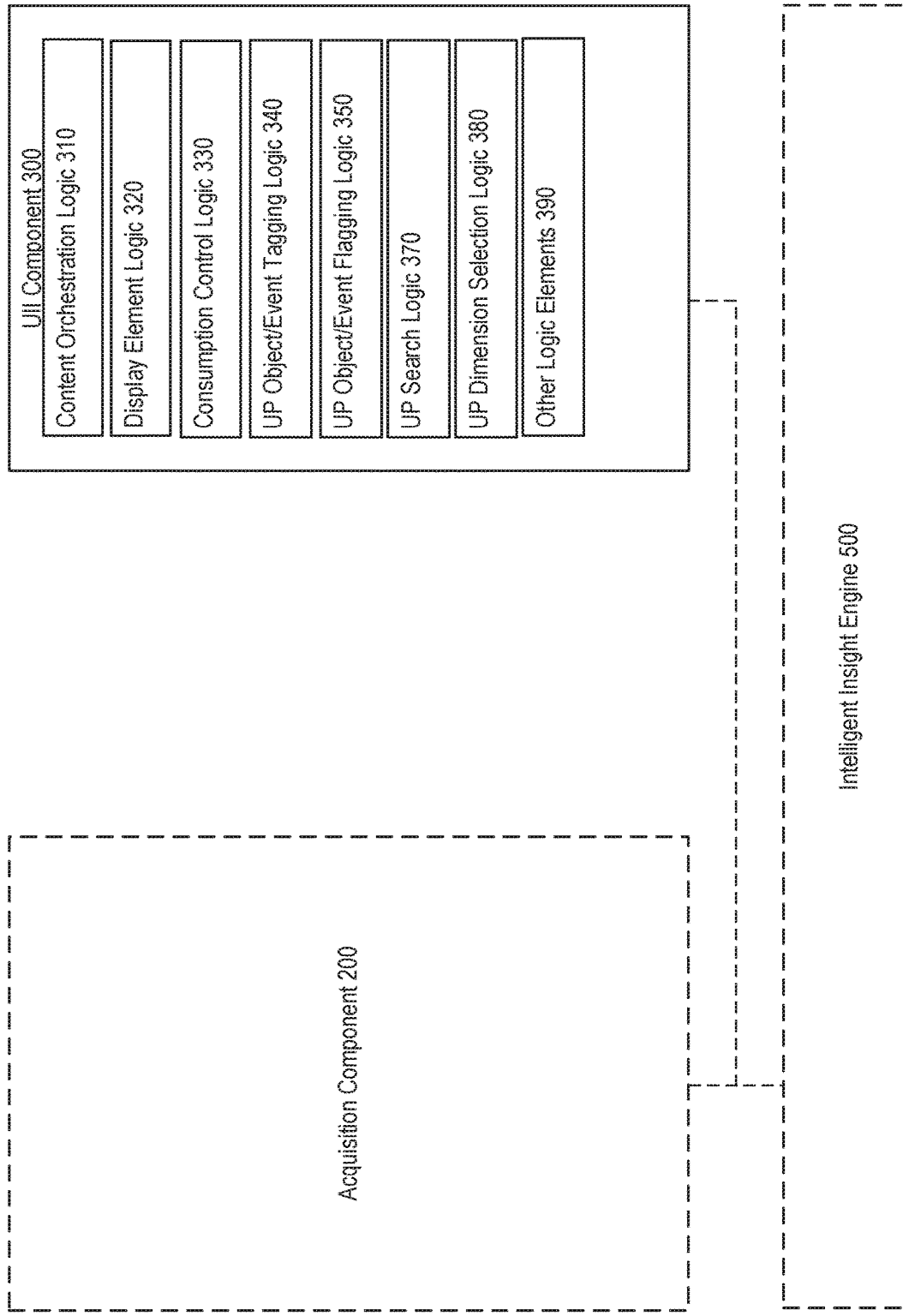
FIG. 1E illustrates a schematic representation of an example architecture of various sub-elements of the intelligent monitoring system of FIG. 1C, in accordance with various embodiments.

FIG. 1E illustrates an example architecture of a UII component 300 that may be implemented in connection with the example intelligent monitoring system depicted in FIG. 1C, in accordance with one or more embodiments of the present disclosure. UII component 300 may be configured to generate an interactive user interface for display at one or more client computing devices 800, and for enabling a user to engage with the technology of the present disclosure.

Through an interactive user interface 400, UII component 300 may provide: (i) a representation of data obtained by acquisition component 200 (or otherwise derived by system 100), (ii) a representation of insights about such data generated by or derived from intelligent insights engine 500, (iii) a representation of information provided by or derived from input contributed by one or more users operating the one or more client computing devices 800, and/or (iv) a representation of one or more interactivity options available to users (e.g., a user viewing the interface as displayed on a display of a client computing device 800).

Such representations may include graphic or textual display elements (e.g., to convey one or more of an insight generated by intelligent insight engine 500, to convey options available to a user, or to convey any other observations or information obtained, in whole or in part, via external resources 600 and/or client computing devices 800). Such display elements may be static or dynamic, selectable or unselectable, and presented adjacent to or as overlay relative to other content, text, or graphics provided for presentation to a user through the interactive user interface 400. UII component 300 may be configured to provide, via the interactive user interface 400, various options for selecting which of the available information should be viewed when, and in which arrangement.

As shown, UII component 300 of FIG. 1E may include content orchestration logic 310, display element logic 320, consumption control logic 330, user prompted (UP) object tagging logic 340, UP event tagging logic 350, UP flagging logic 360, UP search logic 370, and UP dimension selection logic 380, among other logic elements 390.

Content orchestration logic 310 retrieves content acquired by acquisition component 200, and coordinates coherent presentation of such content through interactive user interface 400. Content orchestration logic 310 may operate on such content to ensure that scale, resolution, perspective (e.g., viewing angle), and other viewing parameter objectives are satisfied in connection with presentation through interactive user interface 400. Content orchestration logic 310 may operate on such content to ensure that correspondence between different representations of related data are aligned.

For example, content orchestration logic 310 may retrieve video content comprising a video of an area being monitored, as well as retrieve map content comprising a map representation of the same area being monitored (or a larger area encompassing the monitored area), and coordinate the presentation of map data in map pane 440 and video data in content pane 410 such that the mapped region shown in map pane 440 relates to the monitored area in the video data that is presented in content pane 410. Content orchestration logic 310 may identify the geographic boundaries associated with the region of space being presented through content pane 410, and determine the corresponding boundaries in the map view shown in map pane 440. Such boundaries may be reflected by one or more graphical display elements presented with (or as an overlay upon) the map data presented in map pane 440.

For example, if the video content presented in content pane 410 depicts a 1-mile×1-mile geographic region, and map pane 440 depicts a 10-mile×10-mile map encompassing the 1-mile×1-mile region shown in the content pane 410, the content orchestration logic 310 may generate and provide a display element within map pane 440 in the form of a box or outline circumscribing the location of the 1-mile×1-mile geographic region shown in the content pane 410.

In some embodiments, the map data represented in map pane 440 may be two dimensional, while the video content being presented in content pane 410 may include higher dimensional data. For instance, video content may be three-dimensional and may have been recorded at a unique angle. Indeed in instances where a video was recorded by a sensor attached to a moving object, the resulting video content item (e.g., the video file) may include multiple frames capturing images of the same area from different angles at different times. Moreover, in advance video recording implementations, the orientation and/or position of the sensory equipment itself may be adjustable relative to the moving object to which it is affixed.

Details of such content capture parameters may be embedded within content retrieved from acquisition component 200, and content orchestration logic 310 may use such details to accomplish appropriate transformations and translations of recorded content to compute and determine correspondence between map data and content data (e.g., for purposes of delineating boundaries, as noted above). In particular, content orchestration logic 310 may be configured to utilize yaw, pitch, roll, angle, distance, pointing direction, and/or other parameters of the sensor (and/or object to which such sensor is affixed) in identifying geographic boundaries associated with a sensors field-of-view and/or the portion of the field-of-view being represented in content pane 410 at any given moment during content playback.

Content orchestration logic 310 may be configured to operate continuously, periodically, on a frame-by-frame basis for video data, or with any degree of regularity required for a given application. Content orchestration logic 310 may be further responsive to user input, including but not limited to, (i) user selection of content from a repository of content items, (ii) interface arrangement and size adjustments, (iii) applied filters or cropping selections, (iv) display device operation capabilities, and the like.

Referring back now to FIG. 1E, UII component 300 may further be configured, via display element logic 320, to provide one or more visual indications of one or more insights, observations, or information about the content being viewed or reviewed by a user operating the interface. In some embodiments, display element logic 320 may generate and/or provide one or more graphical or textual display elements associated with the content or other information being presented. Such graphical or textual display elements may be presented to convey one or more insights provided by intelligent insight engine 500 with respect to the content being presented, one or more observations made and inputted by a user with respect to the content being presented, or any other information obtained by system 100 with respect to the content being presented.

For instance, the graphical or textual display elements presented through content pane 410 may provide indications of one or more insights or other observations made that correspond to the content being presented through content pane 410. Graphical and textual display elements may include any visual representation of information, including but not limited to an icon, a symbol, a mark, a badge, a thumbnail, a graph, a church, a plot, an image, etc. For instance, a graphical display element may include an icon that overlays a real-world object (e.g., a vehicle, a person, a building, a ship, a tree, a bench, etc.) identified within the content by, for example, intelligent insight engine 500.

Display element logic 320 may be configured to generate and/or provide such graphical or textual display elements as dynamic elements. For purposes of the present disclosure, the term "dynamic" generally refers to a changeability or adjustability of a characteristic. Such a characteristic may include any conveyable information, which in the case of a display element, may include but not be limited to hue, saturation, luminance, size, shape, position (e.g., relative position within a pane of the interface), display status (e.g., being displayed or not being displayed), lettering, numbering, spelling, description, etc. For instance, extending the icon example above, an icon that overlays a real-world object identified in a series of frames of a video feed may be dynamic in that it may change positions within content pane 410 (e.g., on a frame-by-frame basis) as the real-world object with which the icon is associated is shown to move about in the real world scene during playback.

Display element logic 320 may be configured to generate and/or provide such graphical or textual display elements as selectable display elements. For purposes of the present disclosure, the term "selectable" generally refers to responsiveness of a displayed item to one or more inputs directed toward the particular displayed item. Such responsiveness may include any response that causes a change that would otherwise not occur absent the selection. Again, further extending the icon example above, the icon that overlays the video representation of a real-world object in a given frame may be selectable to cause additional information, e.g., information corresponding to the associated real-world object, to be shown within the interface.

For instance, a user of user interface 400 may use a computer mouse to hover over or click upon the icon overlaying the real-world object to establish a selection of the same. Upon selection, display element logic 320 may be configured to display additional information about the real-world object, such as the object's GPS coordinates, a zoomed-in micro video feed of the object overlaying a portion of the zoomed-out macro video feed of the object, the name or type of the object, a note made by another user with respect to such object, an alert/suggestion/recommendation with respect to such object, or any other information. Display element logic 320 may, alone or together with other logic elements, coordinate the display or accessibility of such additional information within any area of the interface, e.g., in any area within content pane 410, map pane 440, insight pane 450, through a menu item a user must access through a tab or by right-clicking (or other method), or anywhere else within user interface 400.

Referring back now to FIG. 1E, UII component 300 may further be configured, via consumption control logic 320, to provide one or more content or data consumption to enable a user (e.g., the user accessing user interface 400 via client computing device 800), to exercise control over when, what, and how the content accessible via user interface 400 is presented. For example, consumption control logic 320 may be configured to provide (e.g., through playback control pane 420) one or more viewer/navigation tools that enable a user to control the viewing, playback, or consumption of the content loaded for presentation through content pane 410. By way of a few nonlimiting examples, viewer tools made available through playback control pane 420 may include any one or more of a full-screen button, a mute button, a play/pause button, a seek slider, a volume slider, a skip button, etc.

Consumption control logic 320 may further be configured to generate a representation of a playback time or timeline. For example, consumption control logic 320 may (e.g., through timeline pane 430) present an indication a playback time or timeline respect to a portion of a given content item that was, is, or may be presented within content pane 410. The indication of playback time or timeline may be made relative to a larger segment of the loaded content item. The indication of playback time or timeline may be textual and/or graphical. In some instances, indication presented through timeline pane 430 may be a graphical or textual display element responsive to selection and manipulation by a user. For instance, the indication presented through timeline pane 430 may take the form of a virtual slider display element that allows a user to adjust the slider's position along a depicted timeline representation (e.g., a progress bar), and correspondingly adjust the content being presented through content pane 410.

In some examples, consumption control logic 320 may cause timeline pane 430 to dynamically provide a timeline graphic display element representing a segment of time associated with a content item. Consumption control logic 320 may further cause timeline pane 432 display a time associated with the content being played back at a given moment, relative to the total length of time (or a segment of the total length of time) associated with the content, which may continuously change as the content item is being played back. Consumption control logic 320 may cause timeline pane 430 to provide indications (e.g., graphical or textual display elements) of insights or other observations associated with a particular time frame within a larger segment of the content.

In some instances, such indications of insights or other observations may be graphically represented in a manner that conveys relative changes of such insights or other observations across a series of smaller content segments (e.g., 5 second increments) within a larger content segment (e.g., 10 minute timeframe) provided within timeline pane 430. For example, the timeline graphic presented in timeline pane 430 may correspond to a five minute timeline window of video content (which may or may not be the entire video file). The time corresponding to the content currently being presented may be represented by a line-marker display element overlaying the portion of the timeline graphic display element that corresponds to the content being played through content pane 410 at the current moment. Display elements within the timeline window (e.g., the line marker display element) may move positions as playback of the video content occurs. In some embodiments, the graphical or textual display elements generated and/or provided via consumption control logic 320 may be user selectable and adjustable. For example, a user viewing content through content pane 410 may wish to return back to an earlier portion of the video segment, and to do so may click a line marker (or other display element associated with the current playback time), and move the line marker to a different position along the timeline graphic display element that is associated with the earlier portion of the video segment.

Referring still to FIG. 1E, UII component 300 may further be configured, via user prompted (UP) object/event tagging logic 340, to receive input from a user identifying an object appearing or event occurring within the content as represented through content pane 410. For example, in a given deployment of the technology disclosed herein, it may be desirable to identify various land formations, structures, and animal traffic in an area being surveyed for a possible windmill farm. Tagging logic 340 may be configured to allow a user to define one or more identification tags, and to associate those identification tags with objects or events that are identified or that otherwise appear within the content.

For example, a user reviewing a flyby video recording of the area under consideration may identify peaks and valleys in the terrain. During review, such user may select the areas associated with such peaks and valleys (e.g., by clicking on them in their corresponding locations as presented within content pane 410 during video playback), and subsequently select the appropriate tag designating such land structures (e.g., a "peak" tag, a "valley" tag, etc.). In another example, such a user may observe one or more animals traveling through the region recorded in the user similarly may click on the representation of the animal in the video recording, and subsequently select the appropriate object tag (e.g., a "bovine" tag, a "coyote" tag, a "deer" tag, etc.) and/or event tag (e.g., "wild animal gathering," or "livestock feeding," etc.).

In connection with tagging logic 340, UII component 300 may further be configured, via user prompted (UP) object/event flagging logic 340, to receive input from a user to flag an identified object or event for further review. That is, in some instances a user viewing a video via content pane 410 may flag identified objects or events of heightened interest, and which they may wish to highlight for further review (e.g., by a supervisor). For example, a user may observe that a building structure appears in the video content on a particular day, and recognize that the video content from the week earlier shows no such building structure. The user may tag the object (e.g., with a "small building" tag) and the event (e.g., with a "new structure observed" tag), and may further flag the object/event for further review, and may include a flag note (e.g., "new building appears to have been erected without authorization from the landowner").

Referring still to FIG. 1E, UII component 300 may further be configured, via UP search logic 370, to provide a search field within which a user may provide input to query a search through a particular content item. User may provide input in any form, for example, free-form text search queries, image queries, tag search queries (e.g., selecting tags of interest), flag search queries (e.g., selecting tags of interest), and the like. For instance, extending the examples above, a user may wish to review only those segments of video within which coyotes appear. As such, the user may utilize UII component 300's search tools to select the "coyote" tag, and responsively UP search logic 370 may present abridged content viewing options for the user such that the user may view only those video segments (e.g., on a frame-by-frame basis) that include at least one object identified as a coyote. UP search logic 370 may further be configured to enable the user to threshold their search query. That is, a user may qualify or quantify their search in any manner. Taking the coyote example, the user may utilize the search tools to not only select the "coyote" tag, but also specify a threshold number of coyotes to further filter the abridged content results. For instance, such user may specify that they would only like to see those video segments (e.g., on a frame-by-frame basis) that include at least five coyotes (instead of any coyotes at all) within the field-of-view.

Further still, in some embodiments the technology of the present disclosure may be implemented to effectuate dimensional determinations with respect to objects identified within the content. UII component 300 may be configured, via UP dimension selection logic 380, to receive input from a user designating a distance between two points in the video content, and to determine a real-world distance between such points. For example, a user observing a video feed within content panel 410 may pause the video on a particular frame, click on a point within the frame and drag the mouse to another point within the frame, and responsively UP dimension selection logic 380 may provide a textual display element providing a number of inches, feet, yards or other dimensional unit representing the distance between the two points. UP dimension selection logic 380 may utilize metadata details included in the content data to make such determinations. For example, such details may include content capture parameters the yaw, pitch, roll, angle, capture distance, pointing direction, and/or other parameters of the sensor (and/or object to which such sensor is affixed). Such details, which may be embedded as metadata within content data, may also include information captured by a device other than the image content capture device, for instance a LiDAR device, and altimeter, etc.

UII component 300 may further be configured with one or more other logic elements 390 configured to receive information from intelligent insights engine 500 and to generate and/or provide indications (e.g., graphical or textual display elements) of one or more insights about the content. Intelligent insights engine 500 may be configured to retrieve and analyze data acquired by acquisition component 200, and utilize that data (alone or together with user inputted data obtained via UII component 300) to generate an "insight." As used in the present disclosure, an "insight" refers to an intelligent observation or detection made by system 100 (entirely or partially unaided by a human user) that may be relevant to a particular context within which the technology is deployed. Together with UII component 300, intelligent insight engine 500 may make determinations that form the basis of one or more automated object detections, event detections, tagging and flagging operations, alerts, suggestions, recommendations, charts, statistical analysis, and/or categorizations relevant within a given context, and as desired by a given user for a particular application. UII component 300 may (e.g., via Insight pane 450) present an indication of any one or more insights or other observations generated or provided, in whole or in part, by intelligent insights engine 500.

Intelligent Insight Engine

Figure 1F:
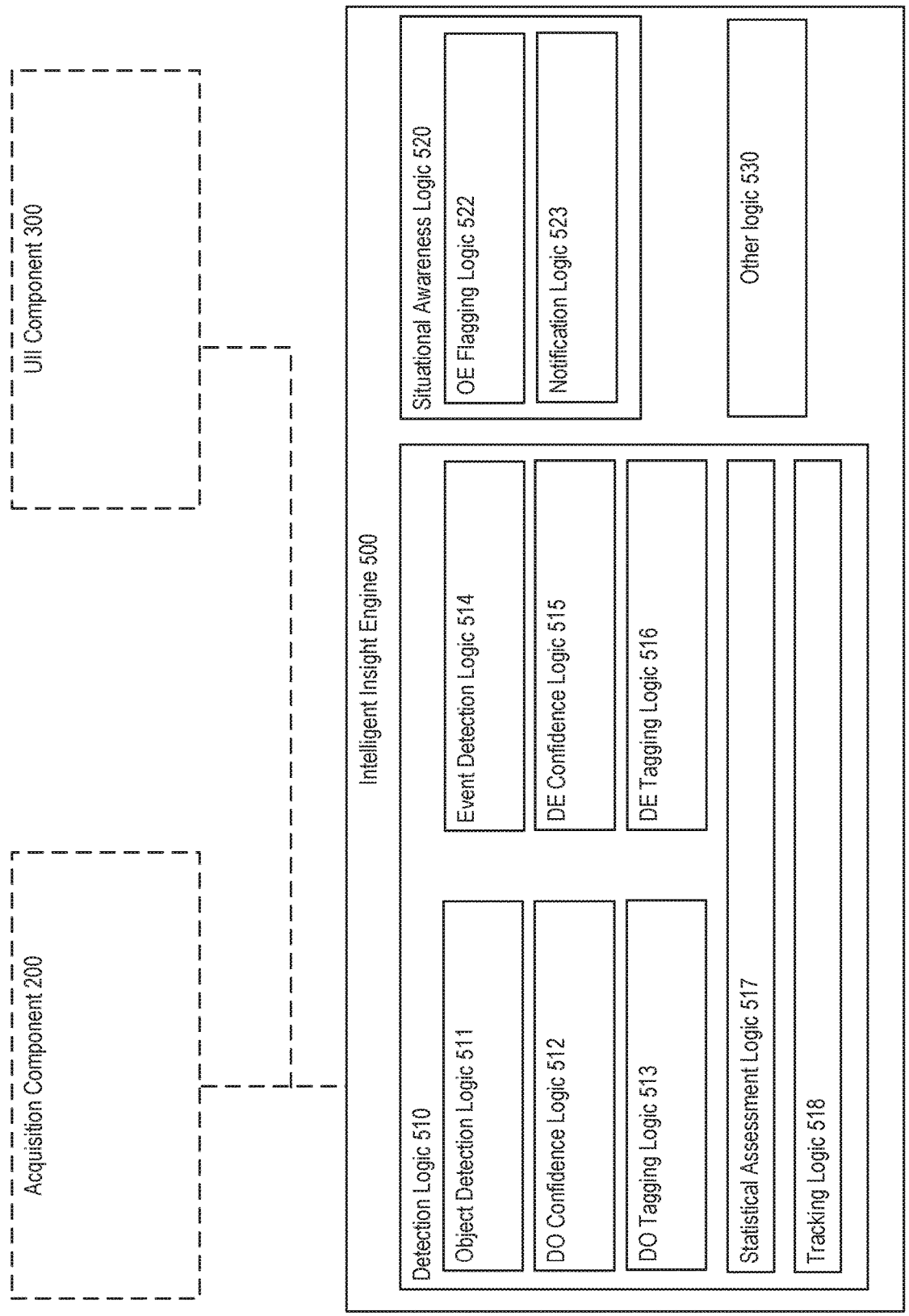
FIG. 1F illustrates a schematic representation of an example architecture of various sub-elements of the intelligent monitoring system of FIG. 1C, in accordance with various embodiments.

As shown in FIG. 1F, an architecture of an example intelligent insight engine 500 may include detection logic 510, situational awareness logic 520, among other logic 530. Detection logic 510 may be configured to identify objects appearing and/or events occurring within content. To effectuate such features, detection logic 510 may include object detection logic 511, detected object (DO) confidence logic 512, detected object (DO) tagging logic 513, event detection logic 514, detected event (DE) confidence logic 515, detected event (DE) tagging logic 516.

Object detection logic 511 detects features appearing within a given segment of content (e.g., within a frame of a video recording), identifies discrete candidate objects or feature collections, compares the identified discrete candidate objects or feature collections with one or more object templates (accounting for scaling, angle capture, orientation of candidate objects or features in feature collections, and the like), and determines that the identified discrete candidate objects or feature collections match an object template within an acceptable degree of confidence (e.g., a predefined confidence threshold).

DO confidence logic 512 may be configured to operate in concert with object detection logic 511, and computes a confidence score based on the match quality between a discrete candidate object (or feature collection) of interest, and one or more of the object templates. For example, if in a given application, system 100 includes object templates corresponding to a vehicle, an office building, a power plant, and a roadway intersection, object detection logic 511 may analyze video content (e.g., on a frame-by-frame basis, on an every nth-frame basis, on a periodic interval of time basis, or other) to identify boundaries between surfaces detectable within the video content, and on the basis of such boundaries identify discrete candidate objects for comparison. On the basis of such identification operations the object detection logic 511 may determine that there are fifteen discrete candidate objects, and may cause a comparison to take place between one or more of the 15 discrete candidate objects and one or more of object templates.

Extending the foregoing example: object detection logic 511, together with DO confidence logic 512, may determine that thirteen of the discrete candidate objects do not match any of the object templates with a confidence score greater than a predefined threshold (e.g., confidence score indicating a greater than 80% match). From among the remaining three discrete candidate objects, object detection logic 511, together with DO confidence logic 512, may determine that: one of the discrete candidate objects matches the object template corresponding to a vehicle with, e.g., a confidence score indicating an 87% match; another one of the discrete candidate objects matches the object template corresponding to an office building with, e.g., a confidence score indicating a 99% match; and the other one of the discrete candidate objects matches the object template corresponding to a vehicle with, e.g., a confidence score indicating a 95% match. In the example implementation (e.g., where a confidence score indicating a greater than 80% match is required to provide an object detection), object detection logic 511 may determine that three of the fifteen identified discrete candidate objects match an object template with an acceptable degree of confidence to effectuate automatic tagging of such objects.

DO tagging logic 513 may be configured to receive instruction from object detection logic 511 and/or DO confidence logic 512, and responsively associate the three discrete candidate objects identified with tags corresponding to their identification. For example, in the foregoing scenario, DO tagging logic 513 may receive instruction from object detection logic 511 and/or DO confidence logic 512 to associate a vehicle tag with the two discrete candidate objects identified as being vehicles, and an office building tag with the one discrete candidate object identified as being an office building. Detection logic 510 may perform the foregoing on a frame by frame basis throughout a video recording. Alternatively, detection logic 510 may be configured to perform a similarity analysis (e.g., on a frame-by-frame basis) to identify discrete candidate objects that appear in multiple frames, and propagate a tag associated with a discrete candidate object in one frame through two the other frames of sufficient similarity. That is detection logic 510 may be configured to track an object from one frame to the next, and propagate previously determined association of a tag with a discrete candidate object throughout a video content item. In some embodiments, such tracking functionality is effectuated by leveraging tracking logic 518.

Event detection logic 514 may be configured to detect changes appearing within a given segment of content (e.g., within a subset of frames of a video recording), identifies candidate events based on those detected changes, compares the candidate event information with one or more event templates (accounting for scaling, angle capture, orientation of candidate objects or features in feature collections, time, and the like), and determines that a candidate event matches an event template within an acceptable degree of confidence (e.g., a predefined confidence threshold).

DE confidence logic 515 may be configured to operate in concert with event detection logic 514, and to compute a confidence score based on the match quality between the candidate event and one or more of the event templates. For example, if in a given application, system 100 includes a library of event templates corresponding to a "windmill operating" event, and a "windmill not operating" event. For example, event detection logic 514 may analyze video content (e.g., on a frame-by-frame basis, on an every nth-frame basis, on a periodic interval of time basis, or other) to identify changes across e.g., a five minute segment of video that are indicative of such events. For example, event detection logic may identify changes in the position of the blade on a particular windmill from one frame to the next throughout the five minute segment of video. Similarly, event detection logic 514 may identify that there are no changes in blade position of another windmill within the same video segment for the same period of time. Event detection logic 514 may then compare the candidate event detections to the event templates to identify matches.

Event detection logic 511, together with DE confidence logic 515, may determine that the first windmill matches the "windmill operating" event template with a confidence score greater than a predefined threshold (e.g., confidence score indicating a greater than 90% match), and that the second windmill matches the "windmill not operating" event template with a confidence score indicating a 95% match. In the example implementation, event detection logic 515 may determine that each of these two event candidates match an event template with a sufficient degree of confidence to effectuate automatic tagging of such events.

DE tagging logic 514 may be configured to receive instruction from event detection logic 514 and/or DE confidence logic 515, and responsively associate the objects associated with the detected event with corresponding event tags. For example, in the foregoing scenario, DE tagging logic 516 may receive instruction from event detection logic 514 and/or DE confidence logic 515 to associate a "windmill operating" event tag with the windmill object identified as having spinning blades, and a "windmill not operating" event tag with the windmill object identified with blades at a standstill. Detection logic 510 may perform the foregoing on a frame by frame basis throughout a video recording, and associate the event tags with the relevant objects giving rise to the event for each frame for which the event is true. In the event a condition changes, for instance, the working windmill's blades stop spinning, detection logic 510 may then associate a "windmill not operating" tag with the subset of frames during which the windmill was detected to have standstill blades. That is, the event tags associated with a given object or set of objects may change over the course of a video content feed.

Statistical assessment logic 517 may be configured to perform statistical analysis on the basis of object detections and or event detections, and may coordinate with UII component 300 to generate or provide graphical or textual display elements within the user interface 400 to represent or otherwise convey such statistical assessments. Statistical assessments performed by statistical assessment logic 517 may be as complex or simple as desired for a given application. In some embodiments, statistical assessment logic 517 may count the number of detections identified (either by detection logic 510 alone, or in combination with detections identified by a user via UP Object/Event tagging logic 340), and provide the count as a graphical and/or textual display element within user interface 400. For example, the count may be provided as simply a total number of such objects that appear throughout the entire video file. In another example, the count may be provided on a more granular basis (e.g., on a frame by frame basis, on a second by second basis, or N-second by N-second basis, and the like) during video playback.

For instance, for purposes of statistical assessment, statistical assessment logic 517 may consider a video segment in five second increments, and may provide a count of the various different objects detected within five second increments, and may coordinate with UII component 300 to display such information in the form of a dynamic histogram chart within the timeline pane 430. Different types of objects may be categorized together and the histogram chart provided within the timeline pane 430 may convey count details for each type of object identified. That is, in an example implementation where object detection logic 511 was configured to detect vehicles, people, and buildings, statistical assessment logic 517 may count the number of vehicles, the number of people, and the number of buildings detected within each five second sub segment of a larger video segment, and may provide a histogram of such count details within timeline pane 430. UII component 300 may adjust an attribute of each type of object such that a user may differentiate between the information conveyed. For instance, vehicles may be associated with a first color, people may be associated with a second color, and buildings may be associated with a third color. An example of this is illustrated in FIG. 1F.

Tracking logic 518 may be configured to track and identify the object across a series of frames, and together with UII component 300, provide and/or generate a graphical display element delineating the objects path as it moves about within the scene being recorded. For example, if a particular animal within a scene is of interest (e.g., either because a user has selected it via UP Object/Event tagging logic 340, or because it has been identified as an animal of interest via detection logic 510), tracking logic 518 may identify the same object in surrounding frames, and generate graphical display elements which, when viewed during playback of the video, delineate a time-based path of movement of the animal throughout the scene. Tracking logic 518 allows intelligent insight engine 500 two patterns of movement associated with certain objects, which may later be used to inform an event detection (e.g., via even detection logic 514), and/or situational awareness that may trigger an automated flag or notification.

Situational awareness logic 520 may comprise object/event (OE) flagging logic 522 and notification logic 523. OE flagging logic 522 may be configured to determine objects or events of heightened interest, and which should be flagged to draw a reviewer's attention upon review (e.g., by a supervisor/human). The determination of such objects or events may be informed by any information generated by or provided by detection logic 510 that indicate the occurrence of an event, or the presence of objects of interest—e.g., the occurrence of events, or the presence of objects that vary substantially from a predefined, predetermined, or learned pattern associated with a particular area being monitored; the occurrence of specific events, or the presence of specific objects predefined as being significant enough to warrant a flag or notification, etc.

For instance, in an application designed for agricultural implementations, detection logic 510 may be configured to detect the dimensions of a river to monitor seasonal changes in flow rate to make watershed determinations. Event detection logic 514 may, over the course of several years of video analysis, learn typical water level ranges for a particular river from one season to the next. The event templates may include, for example, "river flow reached 500 ft.$^3$ per second," "river flow reached 600 ft.$^3$ per second," and so forth. If, however, detection logic 510 detects a sudden increase in flow rate from 500 ft.$^3$ per second to 3000 ft.$^3$ per second, situational awareness logic 520 may recognize this as sufficiently atypical to warrant flagging the event for additional review and/or generating a notification which, in coordination with UII component 300, may be conveyed to a user via user interface 400. An event such as the sharp increase in water flow rate in the foregoing example may be indicative of a flood, dam leakage, or other event causing concern from an agricultural, environmental, safety, or other perspective.

Object/event (OE) flagging logic 522 may be configured to flag the relevant event and provide UII component 300 with any information needed to inform the generation of a graphical or textual flagging display element via a user interface 400. Similarly, notification logic 523 may be configured to provide UII component 300 with any information needed to inform the generation of a graphical or textual notification display element via user interface 400. Such notifications may take any form, including but not limited to an alert, a recommendation, a hypothesized assessment, a suggestion, a warning, or otherwise.

As noted above, various other logic 530 may be provided in connection with UII component 300. For example, a computer vision logic may be implemented where the video content of a particular region has been recorded from at least two positions. Computer vision logic may derive structural features using two or more image frames capturing a particular region, and generate models of objects that may be utilized as overlays in other applications or other parts of interface 400. For instance, if intelligent insights engine 500 detects a building within a scene, and captures several images from the scene that include the same building from different angles, computer vision logic may leverage parallax based 3D reconstruction algorithms to generate a 3D model of the detected building (including its various features, e.g., dimensions, doors, windows, etc.). The model may be used to augment the map display shown in map pane 410.

In another example, other logic 530 may include occupant logic configured to detect a number of individuals within a particular space or structure (e.g., a building, a vehicle, a stadium, etc.). For instance, if intelligent insights engine 500 detects a building within a scene, occupant logic may be configured to identify the number of occupants within the building detected (e.g., based other information accessible to system 100, such as heat signature information from thermal imagery). Occupant logic may further be configured to detect other attributes about occupants (e.g., child/adult distinction, approximate age, identity, etc.).

As noted, intelligent insight engine 500 may be configured with various logic to provide highly granular level of analysis that may be presented (via an interactive user interface provided by UII component 300 in accordance with the present disclosure) to one or more reviewers in a complete or tailored fashion, on-the-fly as such one or more reviewers review the content through content respective content panes 410 at their respective client computing devices 800.

Referring back now to FIG. 1C, it should be appreciated that any one or more of network communication links 190 may traverse one or more data networks (e.g., Local Area Networks and Wide Area Networks) to effectuate communication between the elements of system 100. A network communication link may be based on a reliable network transport protocol such as TCP/IP or the like. A network communication link 190 between client computing devices 800, and devices 110 may be established as and when needed, for example, when the device 110 or a client computing device 800 at a particular site needs to send data to the other. Alternatively, a network communication link, e.g., any one of network communication links 190 may span the life of a session during which data is sent back and forth between the devices 110 and a user site in multiple communication exchanges. Either the devices 110 or a client computing device 800 at a user site may initiate establishment of a network communication link 190. The network communication link 190 may traverse a number of intermediary devices (e.g., web servers, cache servers, proxy servers, content delivery network servers, etc.) between devices 110 and the client computing device 800 at the given user site. In this case, the one or more network communication links 190 may be viewed as a logical network communication link made up of a number of sub-network communication links connecting a client computing device 800 to device 110 through the intermediary devices in a network.

Example Interactivity

Figure 2A:
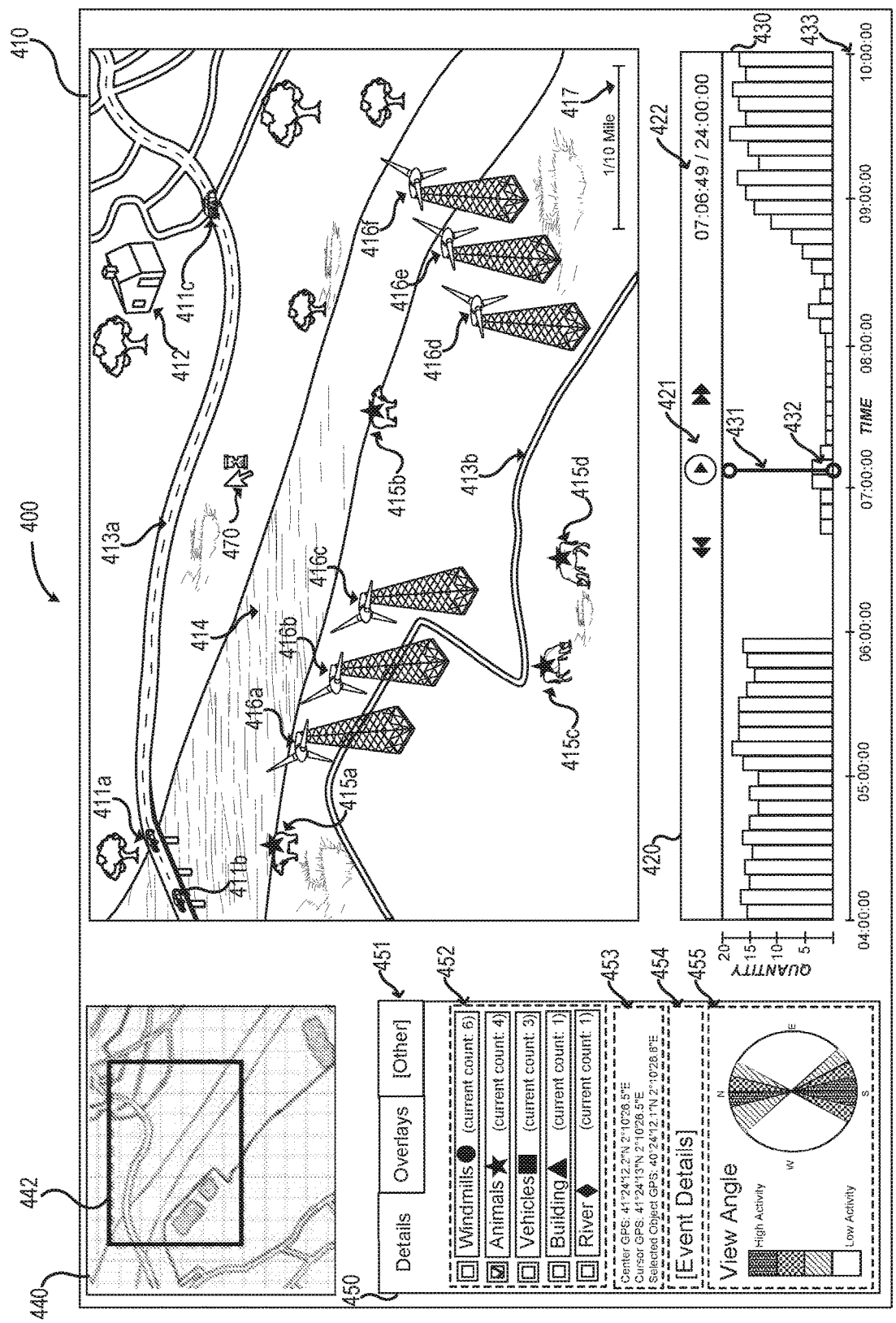
FIG. 2A illustrates an example of various features that may be implemented in connection with a user interface through which the advanced consumption, insight and interactivity technologies of the present disclosure may be provided.

FIG. 2A illustrates an example of various features that may be implemented in connection with an intelligent interface through which the advanced consumption, insight and interactivity technologies of the present disclosure may be provided. In this example, suppose an environmental interest group is interested in monitoring the impact that a new windmill farm is having on the animal population in a particular area. The agricultural group may record video of the area from an overhead site (e.g., a cell tower, an air balloon, a drone, an airplane, a kite, etc.), and wish to review insights and events pertaining to animal activity in the area. Content orchestration logic 310 of system 100 may retrieve video content collected by the environmental interest group, the video content comprising video data of the area of interest. As seen in FIG. 2A, for example, content pane 410 may display video content playback of a real world scene being monitored. In FIG. 2A, the real world scene shown in FIG. 2A includes several vehicles 411*a-c*, a building 412, roadways 413*a-b*, a river 414, various animals 415*a-d*, and the windmills 416*a-f*.

Content orchestration logic 310 of system 100 may further retrieve map content comprising a map representation of an area encompassing the monitored area, and coordinate the presentation of map data in map pane 440 simultaneously with video data in content pane 410 such that the mapped region shown in map pane 440 relates to the monitored area in the video data that is presented in content pane 410. As seen in FIG. 2A, the map information displayed in map pane 440 corresponds, in part, to the region of space being displayed in content pane 410. Content orchestration logic 310 may identify the geographic boundaries associated with the region of space being presented through content pane 410, and determine the corresponding boundaries in the map view shown in map pane 440. Such boundaries may be reflected by one or more graphical display elements presented with (or as an overlay upon) the map data presented in map pane 440. As seen in FIG. 2A, a rectangular outline graphical display element 442 is displayed in map pane 4102 delineate the geographic boundaries associated with the region of space being presented through content pane 410.

Though not shown, one or more zoom tools may be provided in connection with map pane 440 and content pane 410. A user may selectively zoom in or out of either or both of the map shown in map pane 440, or the content shown in content pane 410, and content orchestration logic 310 may dynamically modify the display of map information in map pane 440 and/or video information in the content pane 410. For instance, a user may zoom in for a closer look at windmills 416a-c, and content orchestration logic 310 may dynamically modify (e.g., reduce) the size of the rectangular outline graphical display element 442 such that it corresponds to the geographic boundaries of the smaller space now being displayed in 410 as a consequence of the zoom in operation.

In some embodiments the user may optionally select to lock the size of graphical display element 442 relative to the map pane, or lock the relative positioning within the pane where the graphical display element 442 appears.

In the case where the user locks the size of the graphical display element 442 relative to the map pane, in the above example where the user zooms in for a closer look at windmills 416a-c, content orchestration logic 310 may dynamically modify (e.g., reduce) the size of the mapped region being displayed in map pane 410 (instead of changing the size of the rectangular outline graphical display element 442) such that the space falling within the locked size graphical display element 442 corresponds to the geographic boundaries of the smaller space now being displayed in 410 as a consequence of the zoom in operation.

In the case where the user locks the relative positioning of the graphical display element 442 within the pane, content orchestration logic 310 may dynamically modify (e.g., shift and reduce) the mapped region being displayed in map pane 410 such that the graphical display element 442 may corresponds to a shifted geographic boundary being shown in content pane 410 but still maintain its position within the map pane 410. FIG. 2A illustrates the graphical display element 442 as being roughly horizontally centered but not vertically centered (i.e., it is positioned closer to the top of the map pane 440 than the bottom of map pane 440). Some users may prefer instead that the graphical display element 442 appear to be centered both vertically and horizontally within the map pane 440, or centered vertically but not necessarily horizontally, or appear to be located within a particular quadrant of the map pane. Any such customizations may be enabled via user selectable options through the interactive interface 400, and effectuated in whole or in part via content orchestration logic 310.

As further shown in FIG. 2A, insights pane 450 may, via operation of UII component 300, present an indication of any one or more insights or other observations generated or provided, in whole or in part, by intelligent insights engine 500. For example, as shown, insights pane 450 may include various tabs (e.g., details tab, overlays tab, etc.) within which to provide one or more insights, observations, and options to display such insights and observations throughout the interface. As shown in the depicted example, for instance, intelligent insights engine 500 may be configured to provide insights within zone 452 in connection with detected (and/or tagged) objects such as windmills, animals, vehicles, buildings, and rivers appearing within a given video recorded scene. Zone 452 may provide an indication of the count of such detected objects within the scene that is being played back at a given moment. Zone 452 may also provide selectable options to show one or more graphical display elements corresponding to the detected objects within the scene.

For instance, if selected (via checkable box, for example), a circle shaped display object may be shown in content pane 410 over or adjacent to each detected and tagged windmill; if selected, a star shaped display object may be shown in content pane 410 over or adjacent to each detected and tagged animal; if selected, a square shaped display object may be shown in content pane 410 over or adjacent to each detected and tagged vehicle; if selected, a triangle shaped display object may be shown in content pane 410 over or adjacent to each detected and tagged building; and, if selected, a diamond shaped display object may be shown in content pane 410 over or adjacent to each detected and tagged river. In the example depicted in FIG. 2A, a user has selected only the "Animals" object category, and as such only star display objects are displayed overlying the four detected animals 415a-d being shown in the scene displayed through content pane 410.

Although the depicted example shows the graphical display elements associated with different objects having different shapes, this not required. Any visual attributes may be used to define a graphical display element for overlay within content pane 410. For instance, all of the graphical display elements may be the same shape but have different color (e.g., windmills identified by a red circular graphical display element, animals identified by a green circular graphical display element, vehicles identified by a blue circular graphical display element, etc.). Moreover, visual attributes may also be used to represent a confidence score (e.g., via DO confidence logic 512) indicating match quality between a discrete candidate object and one or more of the object templates. For instance, taking the example of colored circles being used as the graphical display elements for overlay, the hue, saturation, or luminance of the colors shown may be used to represent a higher or lower confidence score. For instance, a bright red colored circle display element might be shown over a windmill that was detected with a high confidence score, while a faded red colored circle might be shown over a windmill that was detected with a low confidence score.

Also as shown in FIG. 2A, insights pane 450 may include a coordinates zone 450 to display various GPS coordinates (or coordinates of another coordinate system) associated with the scene as shown in content pane 410 during playback. By way of example only, coordinates zone 450 may display the GPS coordinates associated with the center of the image being shown in the content pane 450, or the GPS coordinates associated with the real-world location corresponding to the position of the user's cursor 470 within content pane 410, or the GPS coordinates associated with one or more of the detected objects (e.g. upon selection by a user).

Also as shown in FIG. 2A, insights pane 450 may include an event details zone 454 wherein a description or other indication of a detected event may be displayed. As noted above, event detection logic 514 may be configured to detect changes appearing within a given segment of content (e.g., within a subset of frames of a video recording), identify candidate events based on those detected changes, and compare the candidate event information with one or more event templates (e.g., accounting for scaling, angle capture, orientation of candidate objects or features in feature collections, time, and the like), and determines that a candidate event matches an event template within an acceptable degree of confidence (e.g., a predefined confidence threshold). If such a detection is made, a description of the event, or an indication that an event has been detected, may be displayed within event details zone 454.

Also as shown in FIG. 2A, insights pane 450 may include a view angle zone 455 depicting a graphical illustration of the various angles or directions from which the video content was recorded throughout the recording. As noted above, system 100 may be configured to obtain various details about image capture parameters (e.g., yaw, pitch, roll, angle, distance, pointing direction, and/or other parameters of the capturing sensor (and/or object to which such sensor is affixed)). As such, system 100 may be configured to generate and display, through view angle zone 455, a distribution or indication of the angles or directions from which the video content in the given video file was recorded. As shown, such visual indications may be shown on a view direction dial that shows a distribution of the most common directions from which the video footage of a particular area was recorded. As shown, based on the high to low activity grayscale key, it appears that for the video content being played back, most of the video was recorded with the sensor's view field pointed North and South, and with some of the video having been recorded with the sensor's view field pointing substantially North and slightly East, or substantially North and slightly West in accordance with the distribution shown, and with some of the video having been recorded with the sensor's view field pointing substantially South and slightly East, or substantially South and slightly West in accordance with the distribution shown, and little-to-no video content having been recorded with the sensor's view field pointing East or West.

Also as shown in FIG. 2A, playback control pane 420 may, via consumption control logic 320, provide one or more viewer/navigation tools 421 that enable the user to control the viewing, playback, or consumption of the content loaded for presentation through content pane 410. As shown, and by way of a few nonlimiting examples, the viewer/navigation tools made available through playback control pane 420 may include a play/pause button, a skip forward button, a skip backward button, among other buttons.

Also as shown in FIG. 2A, timeline pane 430 may display one or more insight indications or other observations in a graphical representation that conveys relative changes of such insights or other observations across a series of smaller content segments (e.g., 6 minute increments) within a larger content segment (e.g. 6 hour timeframe) in a 24 hour video file. For example, to convey these indications, system 100 may generate a histogram chart to represent the count of certain one or more objects detected within the scene at a corresponding time.

For example, statistical assessment logic 517 may consider a video segment in six minute increments, and may compute a count of the various different objects detected within such six second increments, and may coordinate with UII component 300 to display such information in the form of a dynamic histogram chart within the timeline pane 430.

In the example shown, the histogram chart shows the count of the objects selected within zone 452 (by way of example, only), here, the count of animals detected. With this feature, a reviewing user may quickly identify areas of interest based on the count of a particular detected object. For instance, a user viewing timeline pane 430 may note that there was a dramatic drop in the number of animal detections at around hour 06:00:00 in the video file, and may slide line marker 431 to the left to review the segment of video feed just prior to and after the dramatic drop from fifteen animal detections to zero animal detections that occurred within a roughly six minute time segment. The user may do so in order to view what else was occurring in the recorded scene at this time that could have caused the animals to have abruptly left the space. This may allow the user to identify, tag, and/or flag events for a second level of review. For instance, the user may see that during the timeframe from 05:54:00-06:00:00 a sudden wind force began that caused the windmills to operate at an inordinately high frequency that irritated the animals, causing them to leave. In addition to the user making such observations, the intelligent insights engine may also be configured to detect, tag, and flag such events, as discussed herein. An example of this is show in FIG. 2B.

Figure 2B:
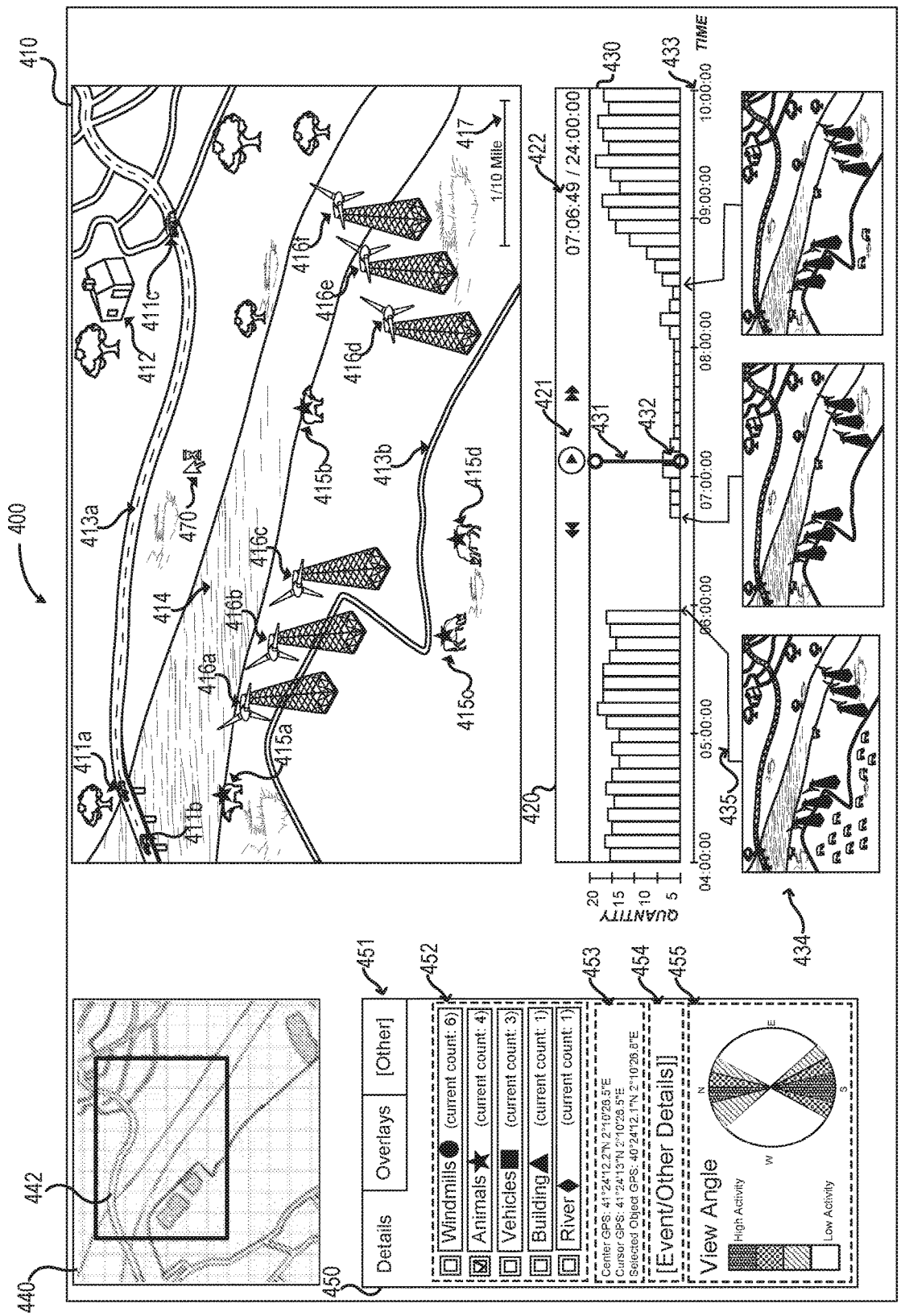
FIG. 2B extends the illustration provided in FIG. 2A to illustrate various additional example features, including event flagging, that may be implemented in connection with a user interface through which the advanced consumption, insight and interactivity technologies of the present disclosure may be provided.

FIG. 2B extends the illustration provided in FIG. 2A to illustrate various additional example features, including event flagging, that may be implemented in connection with a user interface through which the advanced consumption, insight and interactivity technologies of the present disclosure may be provided. As shown in FIG. 2B, a thumbnails/snapshots 434 of particular frames that correspond to detected events may be provided within interface 400. A reviewing user may click or otherwise select such a thumbnail to quickly navigate to a portion of the video content that corresponds to the event flag. The event flag indication may also include a representation of a precise position 435 within the timeline where the detected event commenced, for example. Such thumbnails/snapshots 434 and other position representations 435 may be provided via an automated detection and flagging operation performed by intelligent insights engine 500 (as discussed herein), or via user input (where a user makes an observation not otherwise detected or flagged by intelligent insights engine 500).

Figure 2C:
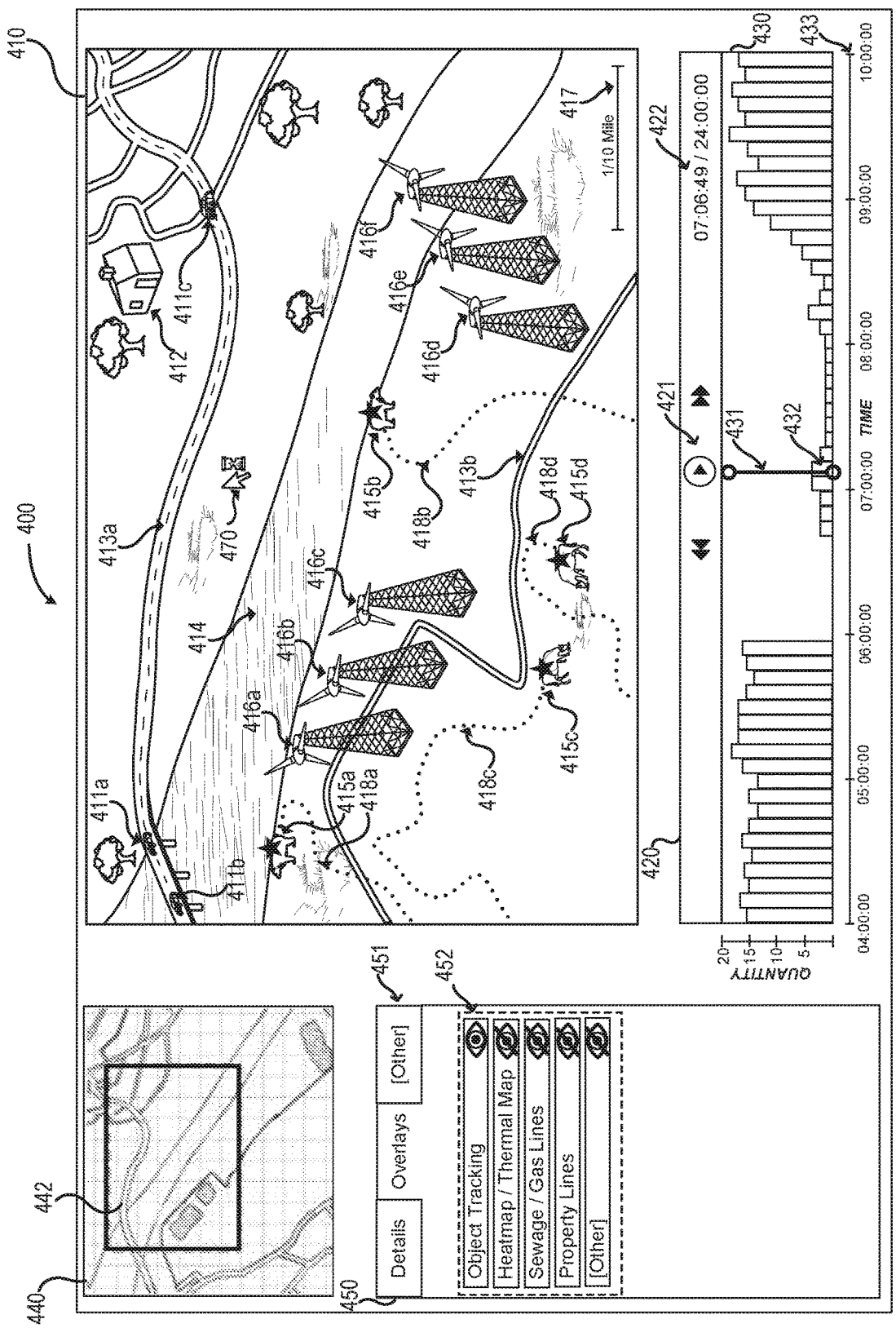
FIG. 2C extends the illustration provided in FIG. 2A to illustrate various additional example features, including event flagging, that may be implemented in connection with a user interface through which the advanced consumption, insight and interactivity technologies of the present disclosure may be provided.

FIG. 2C extends the illustration provided in FIG. 2A to illustrate various additional example features that may be implemented in connection with a user interface through which the advanced consumption, insight and interactivity technologies of the present disclosure may be provided. In particular, FIG. 2C illustrates another optional tab (e.g., an overlays tab) that may be provided within insights pane 450 to enable a user to selectively display one or more overlays (in addition to the object detection overlays discussed above with reference to FIG. 2A (e.g., under the details tab). Such overlays may include an overlay of any feature that has some relation to the scene being viewed in content pane 410.

In the example shown in FIG. 2C, the overlays tab may provide for selection of an object tracking overlay, a heat-map overlay, a sewage/gas line overlay, a property line overlay, or any other overlay desired for the given application (and made accessible to system 100). A user may select which of the provided overlays he/she would like to have displayed within content pane 410 and/or map pane 440. For instance, in the illustrated example of FIG. 2C, the object tracking overlay has been selected (with the remaining overlays unselected, for example) and the content pane 410 therefore shows the path information that intelligent insight engine 500 gathered for objects shown within the scene. For simplicity, the depiction in FIG. 2C only shows tracking information for the animals 415*a-d* (represented as dotted lines along the path the animal traveled leading up to their position in the current frame being played back). Such tracking features may be provided, as discussed herein, by tracking logic 518. Tracking logic 518 can be configured to track and identify objects of interest across a series of frames, and together with UII component 300, provide and/or generate a graphical display element delineating the objects path as it moves about within the scene being recorded. Though not shown in FIG. 2C, content pane may also display any other overlays selected by the user (e.g., heatmap/thermal map overlay, sewage/gas line overlay, property line overlay, or any other attribute of interest and made accessible to system 100).

Figure 2D:
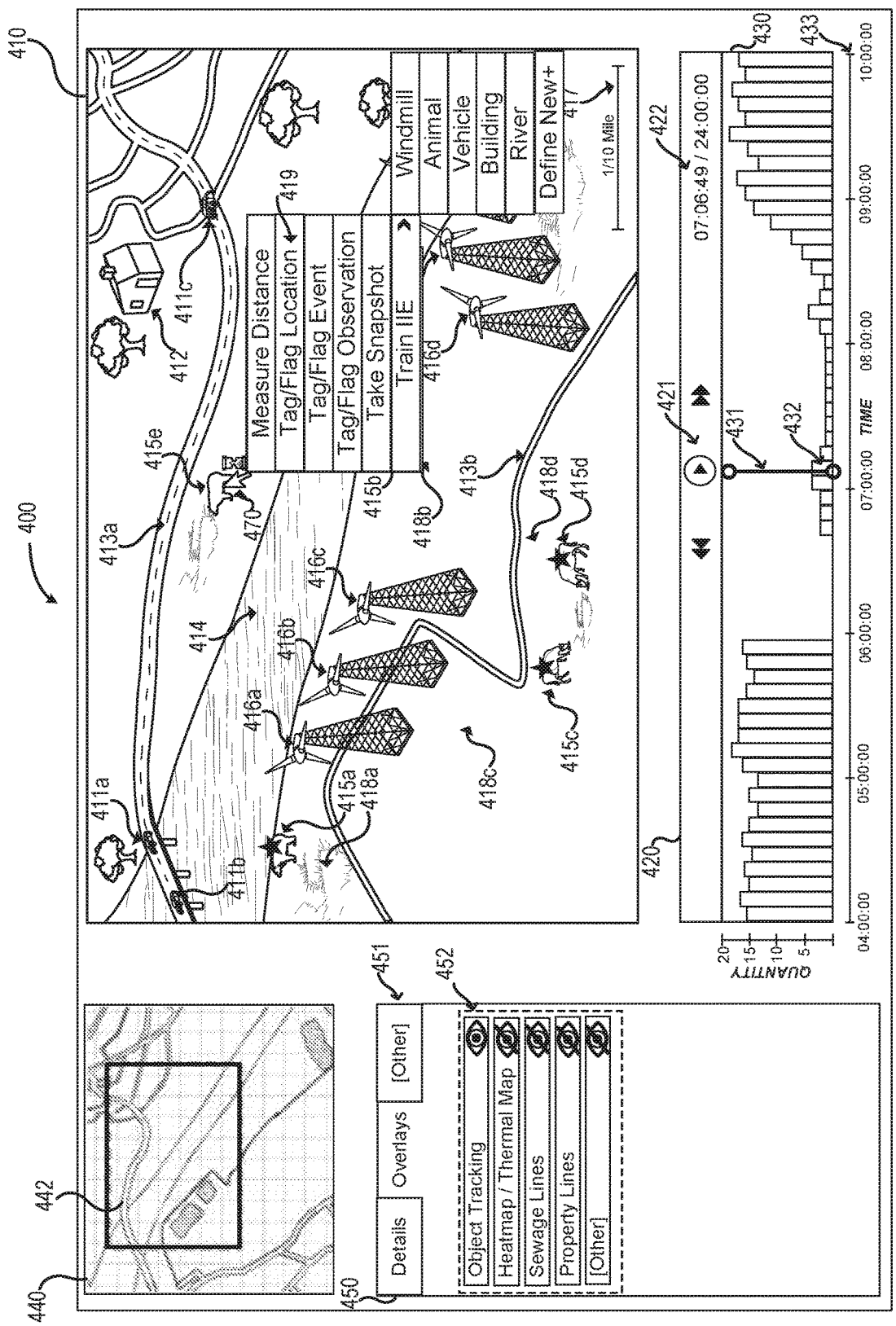
FIG. 2D extends the illustration provided in FIG. 2A to illustrate various additional example features, including event flagging, that may be implemented in connection with a user interface through which the advanced consumption, insight and interactivity technologies of the present disclosure may be provided.

FIG. 2D extends the illustration provided in FIG. 2A to illustrate that system 100 may be configured so that various example features provided in connection with intelligent insights engine 500 may also be supplemented or provided by input from a user. For example, as shown in FIG. 2D, a user may right click on an object within a scene to access a dropdown menu 419 of options including, for example, one or more of a distance measure option, a tag or flag object option (or a location that is not an object), a tag or flag event option, a tag or flag observation option, a take snapshot option, a train IIE 500 option. The train intelligent insights engine 500 may be provided to enable a user to aid the system in learning and adjusting its criteria for object and event detection. For instance, if during review of the video content the user notices that there is an animal 415*e* within the scene that the intelligent insights engine 500 did not detect, the user may hover their cursor over the animal 415*e* while right clicking (or other selection) to display the dropdown menu 419, then expand the menu under the Train IIE item and select the "Animal" option to tag the animal 415*e* as an animal within the video content. Not only may the system 100 store/display the tag during a later review of the video content, but intelligent insights engine 500 may identify features of the selected object that it may consider in making future detections of "Animal" type objects in the future. In this way, the intelligent insights engine 500 may learn from user input, and become more intelligent with increased use. The user may also be enabled to define a new object type from within the drop-down menu, as shown in FIG. 2D.

Example Methods

Figure 3A:
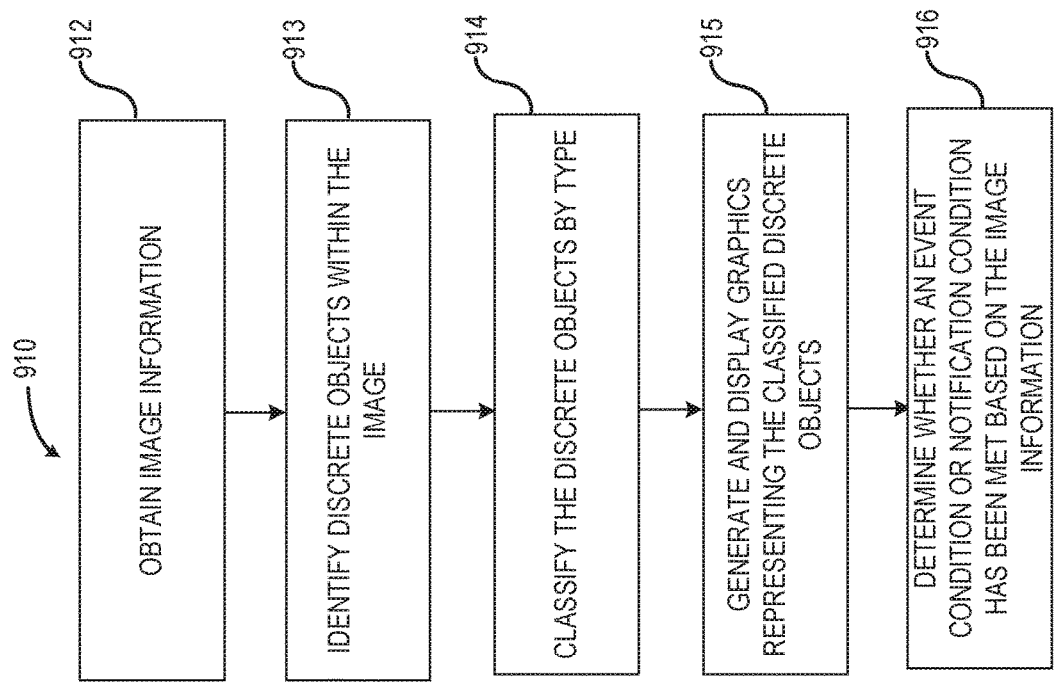
FIG. 3A is a flow chart illustrating example operations that may be performed to effectuate intelligent monitoring in accordance with various embodiments.

FIG. 3A is a flow chart illustrating example method 910 that may be performed to effectuate intelligent monitoring in accordance with various embodiments. At operation 912, method 910 involves obtaining image information representing an environment. Such information may be obtained for at least the purpose of provide the image information for display on at least one computing device. At operation 913, method 920 involves identifying one or more discrete objects observed within the image information. At operation 914, method 920 involves classifying the one or more discrete objects based on the image information (e.g., in comparison with an object template among a library of object templates). At operation 915, method 920 involves generating a graphic representing the classified one or more discrete objects observed within the environment. At operation 916, method 910 may involve determining, based on the image information, that an event condition or a notification condition associated with the discrete object has been satisfied.

Figure 3B:
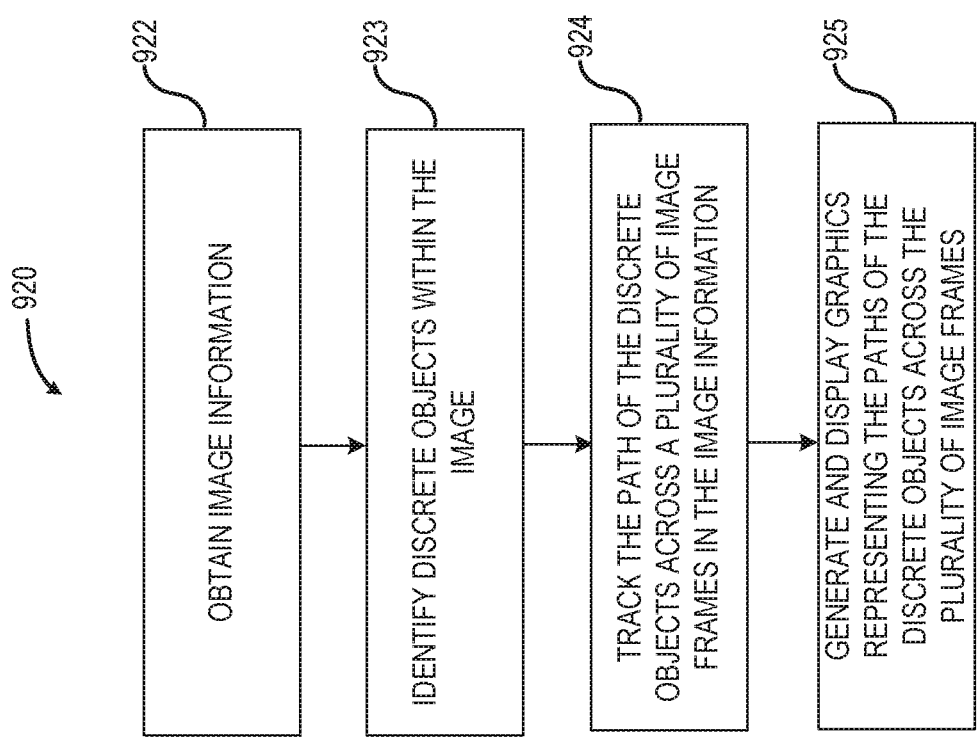
FIG. 3B is a flow chart illustrating example operations that may be performed to effectuate intelligent monitoring in accordance with various embodiments.

FIG. 3B is a flow chart illustrating example method 920 that may be performed to effectuate intelligent monitoring in accordance with various embodiments. At operation 922, method 920 involves obtaining image information representing an environment. Such information may be obtained for at least the purpose of provide the image information for display on at least one computing device. At operation 923, method 920 involves identifying one or more discrete objects observed within the image information. At operation 924, method 920 involves tracking the path of one or more discrete objects over a period of time (e.g., across a plurality of image frames in the image information). Other embodiments may involve tracking location information, path information, and heat signature information associated with the discrete objects. The operation 925, method 920 involves generating a graphic representing the path of one or more discrete objects observed within the environment. Though not shown in FIG. 4B, method 920 may further involve classifying the one or more discrete objects based on the image information in comparison with an object template among a library of object templates; generating a graphic representing the identity or location of one or more discrete objects observed within the environment; and/or display the graphic as an overlay on top of the displayed image information, wherein the graphic is provided over a location on the displayed image information corresponding to the location of the discrete object within the environment at the time the image information was captured. Some implementations of method 920 may further include determining, based on the tracking, that an event condition associated with the discrete object has been satisfied.

Example Computer System

Figure 4:
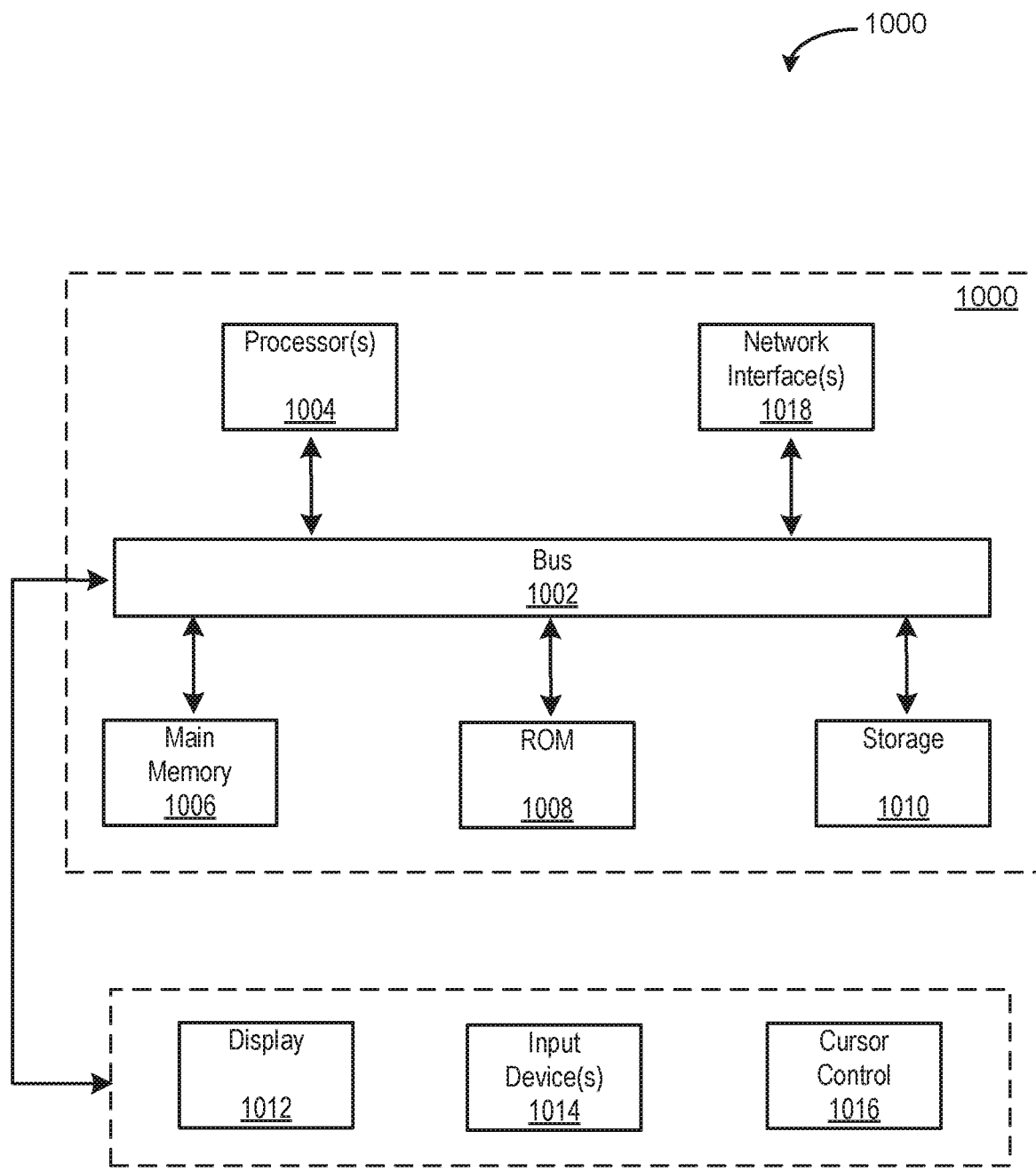
FIG. 4 illustrates a schematic representation of an example computer system in which any of the implementations described herein may be implemented.

FIG. 4 depicts a block diagram of an example computer system 1000 in which any of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A system for intelligently monitoring an environment, comprising:

one or more processors; and a memory storing instructions that, when executed by the one or more processors, cause the system to:

obtain image information representing an environment, the image information comprising a plurality of image frames;

provide the image information for display on at least one device;

identify, based on the image information, one or more discrete objects observed within the environment;

track a path of the one or more discrete objects within the environment across the plurality of image frames of the image information;

generate a graphic representing the path of the one or more discrete objects across the plurality of image frames of the image information; and display the graphic as an overlay on top of the displayed image information, wherein the graphic is provided over a portion of the displayed image information corresponding to a set of locations of the discrete object within the environment at a time the image information was captured.

2. The system of claim 1, wherein the memory stored instructions that, when executed by the one or more processors, further causes the system to:
determine, based on the tracking, that an event condition associated with the discrete object has been satisfied; and
modify the graphic based on the satisfaction of the event condition.

3. The system of claim 1, wherein the memory stored instructions that, when executed by the one or more processors, further causes the system to:
determine that a notification condition associated with the discrete object has been satisfied; and
modify the graphic based the satisfaction of the notification condition.

4. The system of claim 1, wherein the memory stored instructions that, when executed by the one or more processors, further causes the system to:
provide, responsive to a user selection of the graphic, a modified view of a portion of the image information corresponding to a cropped zone within the environment surrounding the identified discrete object.

5. The system of claim 1, wherein the memory stored instructions that, when executed by the one or more processors, further causes the system to:
estimate a real-world dimensions of a portion of at least one of the identified discrete objects.

6. The system of claim 1, wherein the memory stored instructions that, when executed by the one or more processors, further causes the system to:
provide, responsive to a user selection of at least two points corresponding to locations within the image information provided for display on a device, an estimated real-world distance between the at least two points.

7. The system of claim 1, wherein the memory stored instructions that, when executed by the one or more processors, further causes the system to:
provide the image information for display on at least two devices operated by two different users;
receive, from one of the at least two devices, a tagging command corresponding to at least one of the discrete objects identified in the image information;
provide, at the others of the at least to devices, an indication of the tagging command.

8. The system of claim 1, wherein the memory stored instructions that, when executed by the one or more processors, further causes the system to:
compute a number of discrete objects identified within a portion of the image information.

9. The system of claim 1, wherein the graphic represents a classification of the one or more discrete objects observed within the environment.

10. The system of claim 1, wherein the graphic comprises a visual attribute providing an indication of a confidence score associated with the identified discrete object.

11. A method being implemented by a computing system including one or more physical processors and storage media storing machine-readable instructions, the method comprising:
obtaining image information representing an environment, the image information comprising a plurality of image frames;
providing the image information for display on at least one device;
identifying, based on the image information, one or more discrete objects observed within the environment;
tracking a path of the one or more discrete objects within the environment across the plurality of image frames of the image information;
generating a graphic representing the path of the one or more discrete objects across the plurality of image frames of the image information; and
displaying the graphic as an overlay on top of the displayed image information, wherein the graphic is provided over a portion of the displayed image information corresponding to a set of locations of the discrete object within the environment at a time the image information was captured.

12. The method of claim 11, further comprising:
determining, based on the tracking, that an event condition associated with the discrete object has been satisfied; and
modifying the graphic based on the satisfaction of the event condition.

13. The method of claim 11, further comprising:
determining that a notification condition associated with the discrete object has been satisfied; and
modifying the graphic based the satisfaction of the notification condition.

14. The method of claim 11, further comprising:
providing, responsive to a user selection of the graphic, a modified view of a portion of the image information corresponding to a cropped zone within the environment surrounding the identified discrete object.

15. The method of claim 11 further comprising:
estimating a real-world dimensions of a portion of at least one of the identified discrete objects.

16. The method of claim 11, further comprising:
providing, responsive to a user selection of at least two points corresponding to locations within the image information provided for display on a device, an estimated real-world distance between the at least two points.

17. The method of claim 11, further comprising:
providing the image information for display on at least two devices operated by two different users;
receiving, from one of the at least two devices, a tagging command corresponding to at least one of the discrete objects identified in the image information;
providing, at the others of the at least to devices, an indication of the tagging command.

18. The method of claim 11, further comprising:
computing a number of discrete objects identified within a portion of the image information.

19. The method of claim 11, wherein the graphic represents a classification of the one or more discrete objects observed within the environment.

20. The method of claim 11, wherein the graphic comprises a visual attribute providing an indication of a confidence score associated with the identified discrete object.

* * * * *